US008833894B2

(12) United States Patent
Iesaki

(10) Patent No.: US 8,833,894 B2
(45) Date of Patent: Sep. 16, 2014

(54) MOTOR CONTROL DEVICE AND IMAGE FORMING APPARATUS

(75) Inventor: Kenichi Iesaki, Ichinomiya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 62 days.

(21) Appl. No.: 13/432,636

(22) Filed: Mar. 28, 2012

(65) Prior Publication Data
US 2013/0070014 A1 Mar. 21, 2013

(30) Foreign Application Priority Data

Sep. 16, 2011 (JP) .................................. 2011-203502

(51) Int. Cl.
B41J 29/38 (2006.01)
B41J 11/42 (2006.01)
G05B 11/01 (2006.01)

(52) U.S. Cl.
CPC *B41J 29/38* (2013.01); *B41J 11/42* (2013.01); *G05B 11/01* (2013.01)
USPC .......................................................... 347/16

(58) Field of Classification Search
CPC .......... B41J 29/38; B41J 11/42; B41J 13/0009
USPC ........................................... 347/16, 101, 104
See application file for complete search history.

(56) References Cited

U.S. PATENT DOCUMENTS

| 5,713,674 | A | 2/1998 | Nakayama et al. |
| 5,751,331 | A * | 5/1998 | Higuchi et al. ............... 347/217 |
| 5,846,007 | A | 12/1998 | Nakayama et al. |
| 6,022,015 | A | 2/2000 | Matsumoto |
| 6,224,051 | B1 | 5/2001 | Nakayama et al. |
| 6,416,148 | B1 | 7/2002 | Du et al. |
| 6,747,426 | B2 | 6/2004 | Katsu et al. |
| 7,097,264 | B2 | 8/2006 | Saito et al. |
| 7,462,998 | B2 | 12/2008 | Akiyama |
| 7,481,506 | B2 | 1/2009 | Saito et al. |

(Continued)

FOREIGN PATENT DOCUMENTS

| CN | 1138310 A | 12/1996 |
| CN | 1363470 A | 8/2002 |

(Continued)

OTHER PUBLICATIONS

First Office Action issued in corresponding Chinese Patent Application No. 201210085480.7 mailed Jul. 24, 2014.

*Primary Examiner* — An Do
(74) *Attorney, Agent, or Firm* — Banner & Witcoff, Ltd.

(57) ABSTRACT

A motor control device comprises: a motor control unit; and a signal output unit, wherein the motor control unit controls a motor based on an output signal of the signal output unit, wherein the motor control unit is configured to function as: a first control unit performs a first motor control, in which a current upper limit is estimated based on a rotation speed of the motor and is input to the motor, a second control unit performs a second motor control, in which a second driving current, which is a driving current lower than the first driving current at the end of the first motor control is input, a third control unit performs a third motor control, in which a third driving current to be input to the motor is determined, and a switching unit that sequentially switches the first, second, and third control units.

11 Claims, 12 Drawing Sheets

(56) References Cited

U.S. PATENT DOCUMENTS

| | | |
|---|---|---|
| 8,419,304 B2 | 4/2013 | Tsugaru et al. |
| 2003/0201740 A1 | 10/2003 | Katsu et al. |
| 2004/0041854 A1 | 3/2004 | Saito et al. |
| 2006/0214965 A1 | 9/2006 | Saito et al. |
| 2007/0075670 A1 | 4/2007 | Akiyama |
| 2009/0026992 A1 | 1/2009 | Tsugaru et al. |
| 2011/0211031 A1* | 9/2011 | Satoh et al. ............ 347/104 |
| 2012/0081062 A1 | 4/2012 | Iesaki |
| 2012/0198395 A1 | 8/2012 | Arisawa et al. |

FOREIGN PATENT DOCUMENTS

| | | |
|---|---|---|
| CN | 1453930 A | 11/2003 |
| CN | 1488514 A | 4/2004 |
| CN | 101124720 A | 2/2008 |
| JP | 07-302121 | 11/1995 |
| JP | 2007-086904 | 4/2007 |
| JP | 2007-221940 | 8/2007 |
| JP | 2012-080648 A | 4/2012 |

* cited by examiner

MOTOR CONTROL DEVICE AND IMAGE FORMING APPARATUS

CROSS-REFERENCE TO RELATED APPLICATION

This application claims priority from Japanese Patent Application No. 2011-203502 filed on Sep. 16, 2011, the entire subject matter of which is incorporated herein by reference.

TECHNICAL FIELD

This disclosure relates to a motor control device and an image forming apparatus.

BACKGROUND

As a technology of conveying a driven object to a target position at high speed, bang-bang control has been known.

The bang-bang control is superior in driving the driven object at high speed. However, the bang-bang control is a simple control method and thus it is difficult to stop the driven object at the target position at high speed by this control method. Meanwhile, as a technology for stopping driven object at a target position at high speed, there has been known feed back control based on a target profile (target trajectory).

SUMMARY

However, even when the above method of setting a limit value of an amount of manipulation based on a saturation current is used for the feedback control, there is a limit in controlling the driven object at high speed with a high degree of accuracy.

With taking into consideration the above, this disclosure provides at least a motor control device capable of stopping a driven object at a target position at high speed with a high degree of accuracy, as compared to the related art.

A motor control device of this comprises: a motor control unit configured to control a motor; and a signal output unit configured to output a signal according to rotation of the motor, wherein the motor control unit controls the motor based on an output signal of the signal output unit so that a driven object, which is driven by the motor, is displaced to a target stop position. The motor control unit is configured to function as: a first control unit, a second control unit, a third control unit; and a switching unit that sequentially switches between the first, second, and third control units.

Herein, the first control unit performs a first motor control, in which a current upper limit, which is an upper limit of current applicable to the motor and is adjusted by current degradation caused by a counter-electromotive force, is estimated based on a rotation speed of the motor specified from an output signal of the signal output unit, and in which a first driving current corresponding to the estimated current upper limit is input to the motor. On the other hand, the second control unit performs a second motor control, in which a second driving current, which is at least one of a driving current lower than the first driving current input to the motor at the end of the first motor control of the first control unit and a driving current lower than a driving current to be input to the motor if the first control unit controls the motor based on the current upper limit estimated from a present rotation speed of the motor, is input to the motor.

The third control unit performs a third motor control, in which a third driving current to be input to the motor is determined, based on both of at least one of a speed and a displacement amount, as an operation amount of one of the motor and the driven object, specified from the output signal of the signal output unit and a target trajectory of the operation amount, and in which the third driving current is input so that the driven object is displaced up to a target stop position along the target trajectory.

According to the motor control device having the above-mentioned configuration, since the motor is driven by the driving current corresponding to the current upper limit in the earlier stage of driving on the driven object, it is possible to drive the driven object by power corresponding to the maximum power of the motor. On the other hand, in the later stage of the driving on the driven object, since the driving current to be input is determined based on both the operation amount of at least one of the motor and the driven object, which are specified from the output signal of the signal output unit, and the target value of the corresponding operation amount, and thus controls the motor, it is possible to stop the driven object at the target stop position at high speed with a high degree of accuracy.

Further, according to this motor control device, in a period from when the motor control of the first control unit finishes to when the motor control of the third control unit starts, the second control unit performs the motor control to suppress the driving current. Therefore, as compared to a case of performing direct switching from the motor control of the first control unit to the motor control of the third control unit and performing the motor control, it is possible to suppress the probability of occurrence of an case, in which the driving current determined from the operation amount of the motor and the target trajectory exceeds the current upper limit Umax, during the motor control of the third control unit, and it is possible to stop the driven object at the target stop position at high speed.

Further, since the motor is driven by the driving current corresponding to the current upper limit in the first control unit, in order to switch the motor control of the first control unit to the motor control of the third control unit smoothly so that the operation state of the driven object is not discontinuous, a driving current close to the current upper limit is input to the motor in the earlier stage of the motor control of the third control unit. If the load on the motor increases at this time, the driving current determined from the target trajectory may exceed the current upper limit, it may caused by saturation that the current amount actually flowing in the motor is smaller than the input driving current.

On the other hand, if the control is switched from the motor control of the second control unit to the motor control of the third control unit after the driving current input to the motor is suppressed by the motor control of the second control unit, it is only necessary to drive the motor by the driving current based on the driving current suppressed by the motor control of the second control unit in the earlier stage of the motor control of the third control unit. Therefore, even if the load on the motor increases, it is possible to suppress the probability that the driving current calculated from the target trajectory would exceed the current upper limit. Therefore, according to this disclosure, it is possible to suppress occurrence of saturation, and it is possible to stop the driven object at the target stop position at high speed. According to this configuration of the switching unit, it is possible to stop the driven object at the target stop position at high speed.

Meanwhile, a motor control device may be configured by as follows. A motor control device of this disclosure comprises: a motor control unit configured to control a motor; and a signal output unit configured to output a signal according to rotation of the motor, wherein the motor control unit controls the motor based on an output signal of the signal output unit so that a driven object, which is driven by the motor, is displaced to a target stop position, wherein the motor control unit is configured to function as: an earlier-stage control unit that operates in an earlier stage of the process of displacing the driven object up to a target stop position, a later-stage control unit that operates in a later stage of the process of displacing the driven object up to the target stop position, and a switching unit that sequentially switches the earlier-stage control unit and the later-stage control unit.

Herein, the earlier-stage control unit performs a earlier motor control, in which a current upper limit, which is an upper limit of current applicable to the motor and which is adjusted by current degradation caused by a counter-electromotive force, is estimated based on a rotation speed of the motor specified from an output signal of the signal output unit, and in which a earlier driving current corresponding to the estimated current upper limit is input to the motor. On the other hand, the later-stage control unit performs a later motor control, in which a later driving current to be input to the motor is determined, based on both of at least one of a speed and a displacement amount, as an operation amount of at least one of the motor and the driven object, specified from the output signal of the signal output unit and a target trajectory of the operation amount, and in which the later driving current is input so that the driven object is displaced up to a target stop position along the target trajectory.

After a predetermined condition is satisfied after the motor control of the earlier-stage control unit finishes, the switching unit operates the later-stage control unit so that driving current is not input to the motor until the predetermined condition is satisfied after the motor control of the earlier-stage control unit finishes.

For example, after the motor control of the earlier-stage control unit finishes, if at least one of the motor and the driven object is displaced by a predetermined amount, it may be considered that the predetermined condition is satisfied. In this case, the switching unit may operate the later-stage control unit. Alternatively, after the motor control of the earlier-stage control unit finishes, if a predetermined time elapses, it may be considered that the predetermined condition is satisfied. In this case, the switching unit may operate the later-stage control unit.

After the motor control of the earlier-stage control unit finishes, in a period when any driving current is not input to the motor, the driven object and the motor is naturally decelerated, and thus the current upper limit Umax is reduced. Therefore, if the period when any driving current is not input to the motor is provided between the earlier-stage control unit and the later-stage control unit as described above, it is possible to suppress occurrence of current saturation in the earlier stage of the motor control of the later-stage control unit, and it is possible to stop the driven object at the target stop position at high speed.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an illustrative embodiment of this disclosure will be described with reference to the accompanying drawings.

First Illustrative Embodiment

Figure 1:
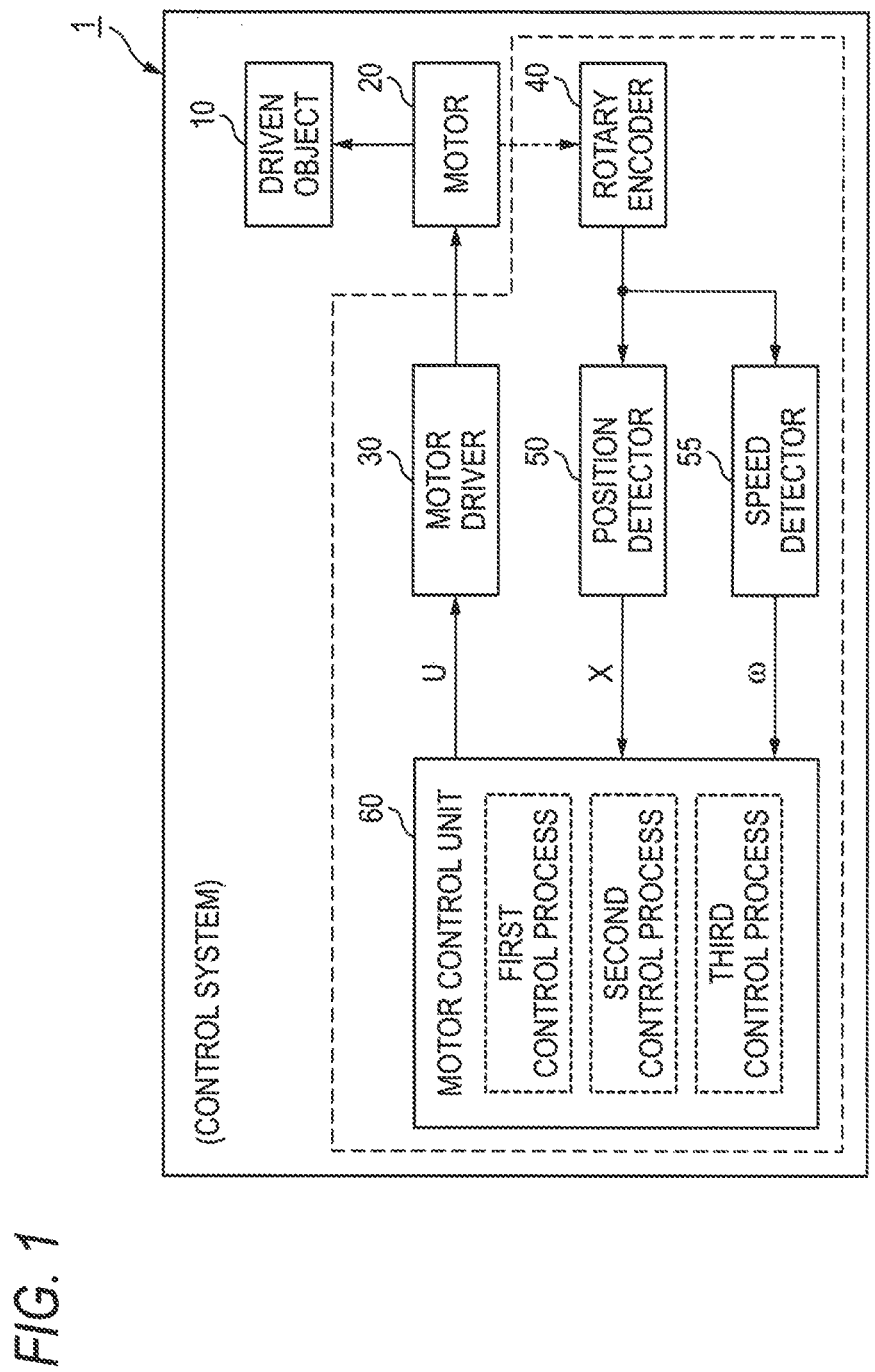
FIG. 1 is a block diagram illustrating a configuration of a control system.

As shown in FIG. 1, a control system 1 of the present illustrative embodiment includes a motor (a DC motor) 20 for driving a driven object 10, a motor driver 30, a rotary encoder 40 connected to a rotation shaft of the motor 20, a position detector 50 for detecting the rotation position X of the motor based on an output signal of the rotary encoder 40, a speed detector 55 for detecting a rotation speed $\omega$ of the motor 20 based on the output signal of the rotary encoder 40, and a motor control unit 60 for calculating a current command value U which is an amount of manipulation on the motor 20.

This control system 1 is incorporated in an electric apparatus such as an image forming apparatus, and performs motor control according to a command which is input from a main control unit (such as a main microcomputer) of the electric apparatus. Specifically, the driven object is one example of a sheet conveying mechanism of an image forming apparatus.

Figure 2:
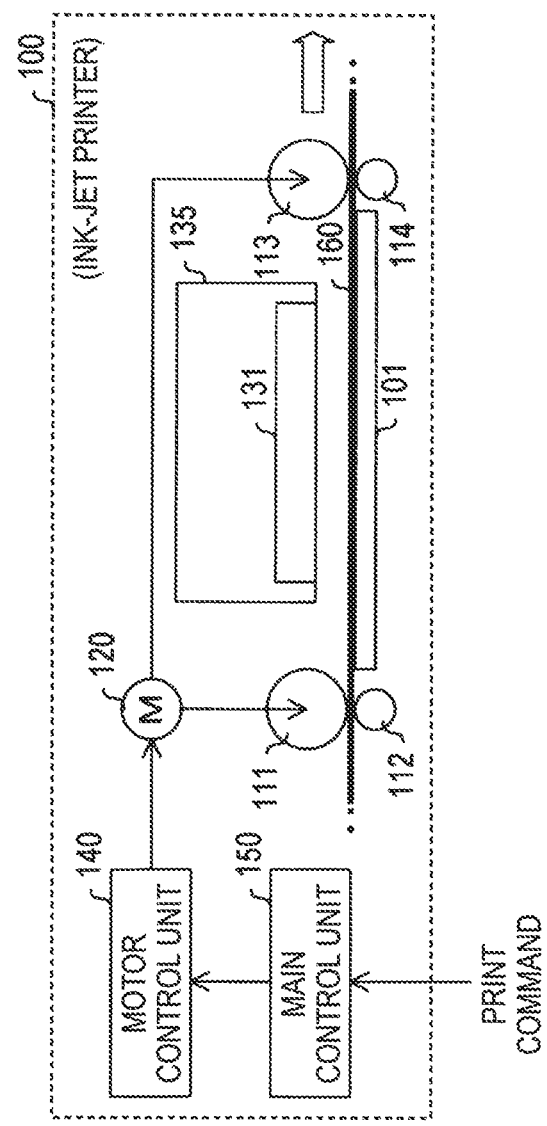
FIG. 2 is view illustrating a configuration of an ink-jet printer.

FIG. 2 illustrates a configuration of an ink-jet printer 100 which is an image forming apparatus. The ink-jet printer 100 includes a conveyance roller 111 and a pinch roller 112 disposed upstream of a platen 101, and includes a discharging roller 113 and a pinch roller 114 disposed downstream of the platen 101. Further, the ink-jet printer 100 includes a recording head (a so-called ink-jet head) 131 capable of image forming on a sheet 160, and a carriage 135 for conveying the recording head 131, which are disposed on the platen 101. Furthermore, the ink-jet printer 100 includes a motor 120 for driving the conveyance roller 111 and the discharging roller 113, a motor control unit 140 for controlling the motor 120, and a main control unit 150 for performing integrated control on the entire ink-jet printer 100 by inputting a command to each of the internal units of the ink-jet printer 100 such as the motor control unit 140.

In this ink-jet printer 100, a sheet conveying mechanism mainly includes the rollers 111 to 114. The conveyance roller 111 and the discharging roller 113 receive power from the motor 120 to rotate in association with each other. In the sheet conveying mechanism, a sheet 160 is fed from a paper feed tray 160 (not shown), and the fed sheet 160 is pinched between the conveyance roller 111 and the pinch roller 112 and is conveyed downward by the rotation of the conveyance roller 111. If the sheet 160 is conveyed to the discharging roller 113 by the rotation of the conveyance roller 111, the sheet 160 is pinched between the discharging roller 113 and the pinch roller 114 and is conveyed downstream by the rotation of the discharging roller 113. According to the synchronous operations of the conveyance roller 111 and the discharging roller 113, the sheet 160 is discharged to a discharge tray (not shown). On the platen 101, the sheet 160 that is conveyed as described above is subject to an ink-drop ejecting operation of the recording head 131.

If receiving a print command from the outside, in order to form an image on the sheet 160 based on image data of a print target designated by the print command, the main control unit 150 of the ink-jet printer 100 inputs a drive command to the motor control unit 140, for rotating the conveyance roller 111 and the discharging roller 113 by a predetermined amount. Accordingly, the motor control unit 140 controls the motor 120 so that the conveyance roller 111 and the discharging roller 113 rotate by the predetermined amount.

The main control unit 150 repeatedly input this drive command, and the motor control unit 140 sends the sheet 160 to an image formation position of the recording head 131 by predetermined amounts. Every time when the sheet 160 is sent by the predetermined amount, the recording head 131 while being conveyed in a main scanning direction (a normal direction of the plane of FIG. 2) perpendicular to the conveyance direction of the sheet 160, performs the ink-drop ejecting operation based on the image data of the print target, thereby forming an image on the sheet 160 on the platen 101 based on the image data of the print target. When the sheet 160 send by the predetermined amount is being stopped, the ink-drop ejecting operation of the recording head 131 is performed. If the ink-drop ejecting operation when the recording head 131 is conveyed once finishes, the sheet 160 is sent by the predetermined amount, once more. Every time when sending the sheet 160 by the predetermined amount as described above, the ink-jet printer 100 shown in FIG. 2 repeats the image forming operation on the sheet 160, and thus a set of images on the sheet 160 based on the image data of the print target is formed.

The control system 1 of the present illustrative embodiment may be incorporated in the ink-jet printer 100 having the above-mentioned configuration. Specifically, the components (components within a dotted line of FIG. 1) of the control system 1 other than the driven object 10 and the motor 20 may be incorporated in the ink-jet printer 100, as the motor control unit 140. In this case, the motor 120 of the ink-jet printer 100 corresponds to the motor 20 of the control system 1. Further, either the conveyance roller 111 and the discharging roller 113, or the sheet 160 corresponds to the driven object 10.

Since the ink-jet printer 100 forms the image on the sheet 160 by sending the sheet 160 by the predetermined amounts, if the sheet 160 is not accurately sent by the predetermined amounts, the quality of the image that is formed on the sheet 160 is deteriorated. Meanwhile, users desire high-speed printing. If the control system 1 of the present illustrative embodiment is applied to a system requiring high speed and accuracy, the control system 1 is effective.

Next, the detailed configuration of the control system 1 will be described. The motor driver 30 (see FIG. 1) of the control system 1 receives the current command value U from the motor control unit 60 and inputs a driving current corresponding to the current command value U to the motor 20 so as to drive the motor 20.

Meanwhile, the rotary encoder 40 is a known rotary encoder which is connected to the rotation shaft of the motor 20 and outputs pulse signals every time when the motor 20 rotates by the predetermined amount. The rotary encoder 40 outputs, as the pulse signals, a phase-A signal and a phase-B signal which are different from each other by $\pi/2$ in phase. The position detector 50 detects the rotation position X of the motor 20 based on the phase-A signal and the phase-B signal output from the rotary encoder 40. Then, the position detector 50 outputs information on the detected rotation position X to the motor control unit 60. Meanwhile, the speed detector 55 detects the rotation speed $\omega$ of the motor 20 based on the phase-A signal and the phase-B signal output from the rotary encoder 40, and inputs information on the rotation speed $\omega$ to the motor control unit 60.

Then, if receiving the drive command from the outside (for example, the main control unit 150), the motor control unit 60 conveys the driven object 10 by a target conveyance amount Pt designated with the drive command.

Specifically, if the drive command is input, in order to move the driven object 10 up to a position (hereinafter, referred to as a target stop position) corresponding to the target conveyance amount Pt, the motor control unit 60 sequentially performs first, second, and third control processes using different control methods in accordance with the position (conveyance amount) P of the driven object 10 specified from the rotation position X of the motor 20. In other words, as shown FIG. 3, the motor control unit 60 performs the first control process in the earlier stage of the driving control on the driven object 10, performs the second control process in the middle stage of the driving control, and performs the third control process in the later stage of the driving control.

In the first control process, based on the information on the rotation speed $\omega$ of the motor 20 received from the speed detector 55, the motor control unit 60 calculates a current upper limit Umax, which is applicable to the motor 20, by a predetermined arithmetic expression $Um(\omega)$, as a current amount adjusted by the current degradation caused by a counter-electromotive force at the rotation speed $\omega$. Then, the motor control unit 60 inputs the current command value U (=Umax), corresponding to the calculated current upper limit Umax, to the motor driver 30. According to this control, a driving current corresponding to the current upper limit Umax is input to the motor 20, so that the driven object 10 is conveyed by nearly maximal capability of the motor 20.

The arithmetic expression $Um(\omega)$ usable for calculating the current upper limit Umax may be experimentally obtained in advance. In a case of theoretically determining the arithmetic expression $Um(\omega)$, based on the rated voltage Vmax of the motor 20, the electromotive force coefficient Ke of the motor 20, and armature resistance Ra, the arithmetic expression $Um(\omega)$ is determined by the following equation.

[Equation 1]

$$U_m(\omega) = \frac{V_{max} - K_e \cdot \omega}{R_a} \quad (1)$$

Figure 4:
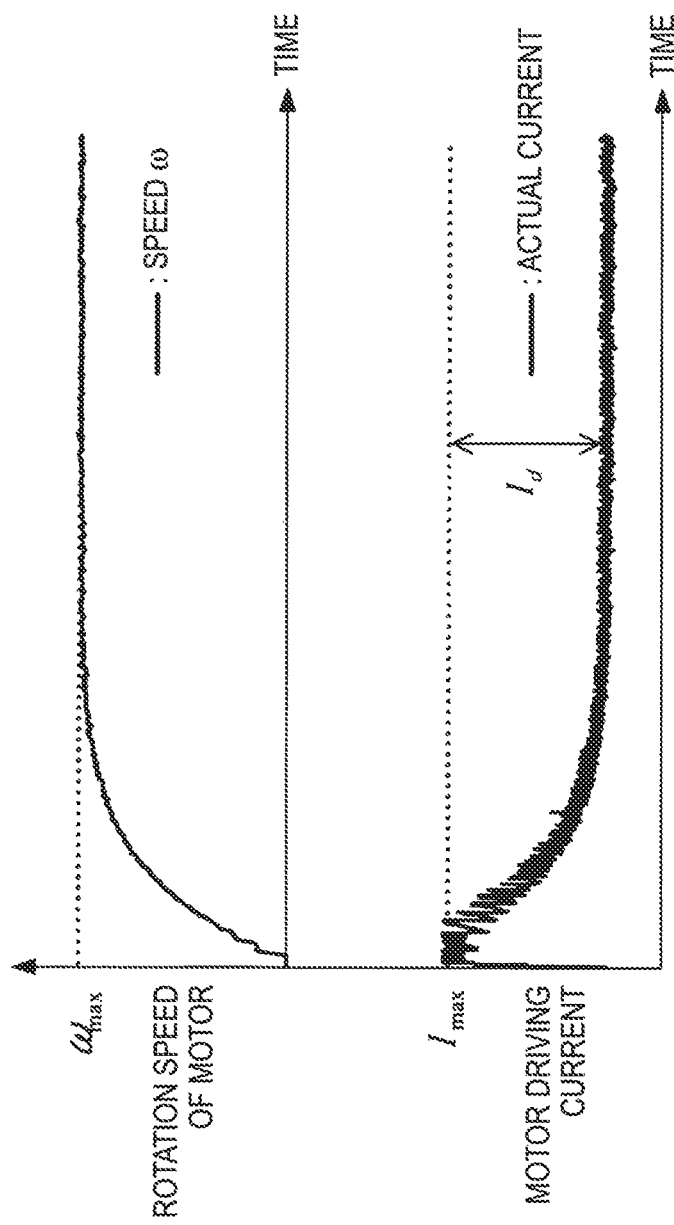
FIG. 4 is a view illustrating a method of deriving a function $Um(\omega)$ for calculating a current upper limit.

On the other hand, in a case of experimentally determining the arithmetic expression Um(ω), as shown in FIG. 4, based on a maximum rotation speed ωmax and current degradation amount Id. The maximum rotation speed ωmax of the motor 20 is obtained by inputting a maximum current amount Imax capable of flowing in the motor 20, when the counter-electromotive force has no effects, in other words, when a maximum current amount Imax when the rotation speed of the motor 20 is zero, as the current command value U (=Imax) to the motor driver 30, and the current degradation amount Id is amount degraded from the maximum current amount Imax in the current flowing in the motor 20 at that time, the arithmetic expression Um(ω) may be determined by the following equation.

[Equation 2]

$$U_m(\omega) = I_{max} - \frac{I_d}{\omega_{max}} \cdot \omega \quad (2)$$

The arithmetic expression Um(ω) is theoretically or experimentally determined. However, in the case of theoretically obtaining the arithmetic expression Um(ω), the current upper limit Umax may not be accurately calculated based on the arithmetic expression Um(ω) due to the influence of an error of a catalog value. For this reason, it is preferable to experimentally obtain the maximum current amount Imax, the current degradation amount Id, and the maximum rotation speed ωmax and determine the arithmetic expression Um(ω).

When the motor control unit 60 performs the second control process instead of the first control process (see FIG. 3), the motor control unit 60 calculates a suppositional current upper limit Uf smaller than the current upper limit Umax, and inputs the current command value U (=Uf) corresponding to the calculated suppositional current upper limit Uf, to the motor driver 30. According to this control, a driving current smaller than the current upper limit Umax is input to the motor 20 so that the driven object 10 is conveyed.

Specifically, in a case of calculating the current upper limit Umax using Equation 2, based on a value If predetermined as a value larger than the current degradation amount Id, the suppositional current upper limit Uf may be calculated by the following equation.

[Equation 3]

$$U_f(\omega) = I_{max} - \frac{I_f}{\omega_{max}} \cdot \omega \quad (3)$$

The value If is determined to be a value so that the current command value U calculated by the third control process does not exceed the current upper limit Umax at assumed load. The value If may be determined by experimentally searching for a value satisfying the above-mentioned condition.

When the motor control unit 60 performs the third control process instead of the first control process, the motor control unit 60 calculates the current command value U based on a position (conveyance amount) P of the driven object 10 from a drive start position (the position when the motor control unit 60 starts the first control process) which is specified as the position of the driven object 10 from the rotation position X of the motor 20 detected by the position detector 50, the speed V of the driven object 10 which is specified from the rotation speed ω of the motor 20 detected by the speed detector 55, and target profiles (that is, target trajectories) regarding the position P, speed V, and acceleration of the driven object 10, so that the driven object 10 follows the target profiles. Then, the motor control unit 60 inputs the current command value U to the motor driver 30. By this operation, the motor control unit 60 controls the position P and speed V of the driven object 10 to be target values.

The target profiles used in the third control process includes a constant speed section and a deceleration section and are set based on the position P (=Pm) and speed V (=Vm) of the driven object 10 at the start time point of the third control process, and the time point Ta which is the start time point of the third control process, for example, as follow.

<Constant Speed Section>

Target Acceleration $Ar=0$ (4)

Target Speed $Vr=Vm$ (5)

Target Position $Pr=Vm \cdot (t-Ta)+Pm$ (6)

<Deceleration Section>
Target Acceleration

[Equation 4]

$$A_r = -\frac{V_m}{T_d}\left\{1 - \cos\left(\frac{2\pi}{T_d}(t - T_b)\right)\right\} \quad (7)$$

$$T_d = 2 \times \frac{V_m}{A_p} \quad (8)$$

Target Speed

[Equation 5]

$$V_r = \int_{T_b}^{t} A_r dt + V_m \quad (9)$$

Target Position

[Equation 6]

$$P_r = \int_{T_b}^{t} V_r dt + P_m + V_m(T_b - T_a) \quad (10)$$

The constant speed section corresponds to a time period from a time point Ta to a time point Tb, and the deceleration section corresponds to a time period from the time point Tb to a time point (Tb+Td). Here, the reference symbol 't' represents time (elapsed time) from when the driving on the driven object 10 starts, the reference symbol 'Tb' represents a time point (hereinafter, referred to as a deceleration start time point) when the deceleration section starts in the coordinate system of time t, and the reference symbol 'Ap' represents the absolute value of a peak of the target acceleration Ar in the deceleration section. The value Ap is determined to a constant value corresponding to the maximum capability of the motor 20.

From Equation 7, the movement amount Pd of the driven object 10 in the deceleration section (hereinafter, referred to a deceleration distance) becomes $V_m^2/A_p$. Therefore, the time length Tc of the constant speed section is set by Pc=(Pt−Pd−Pm)/Vm so that the driven object 10 stops the target stop position Pt, and the deceleration start time point Tb is set by Tb=Ta+Tc.

In the second control process, a feedback control system, or a two-degree-of-freedom control system configured by a feedback control system and a feed-forward control system may be used to calculate the current command value U. A transfer function for calculating the current command value U is determined based on the features of the driven object 10 by a known method.

In the present illustrative embodiment, the first, second, and third processes having the above-mentioned configuration are switched and performed so that the driven object 10 is conveyed to the position corresponding to the target conveyance amount Pt at high speed with a high degree of accuracy.

Specifically, according to the first control process, the driven object 10 is driven by nearly maximal capability of the motor 20. Further, in the third control process, in order to make it possible to decelerate and stop the driven object 10 by nearly maximal capability of the motor 20, the target profiles in the deceleration section are set so that a peak of a target acceleration Ar in the deceleration section becomes a constant value −Ap corresponding to the maximum capability of the motor. In the present illustrative embodiment, the above-mentioned method of accelerating, decelerating, and stopping the driven object 10 is used to convey the driven object 10 to the target stop position Pt at high speed with a high degree of accuracy.

Figure 3:
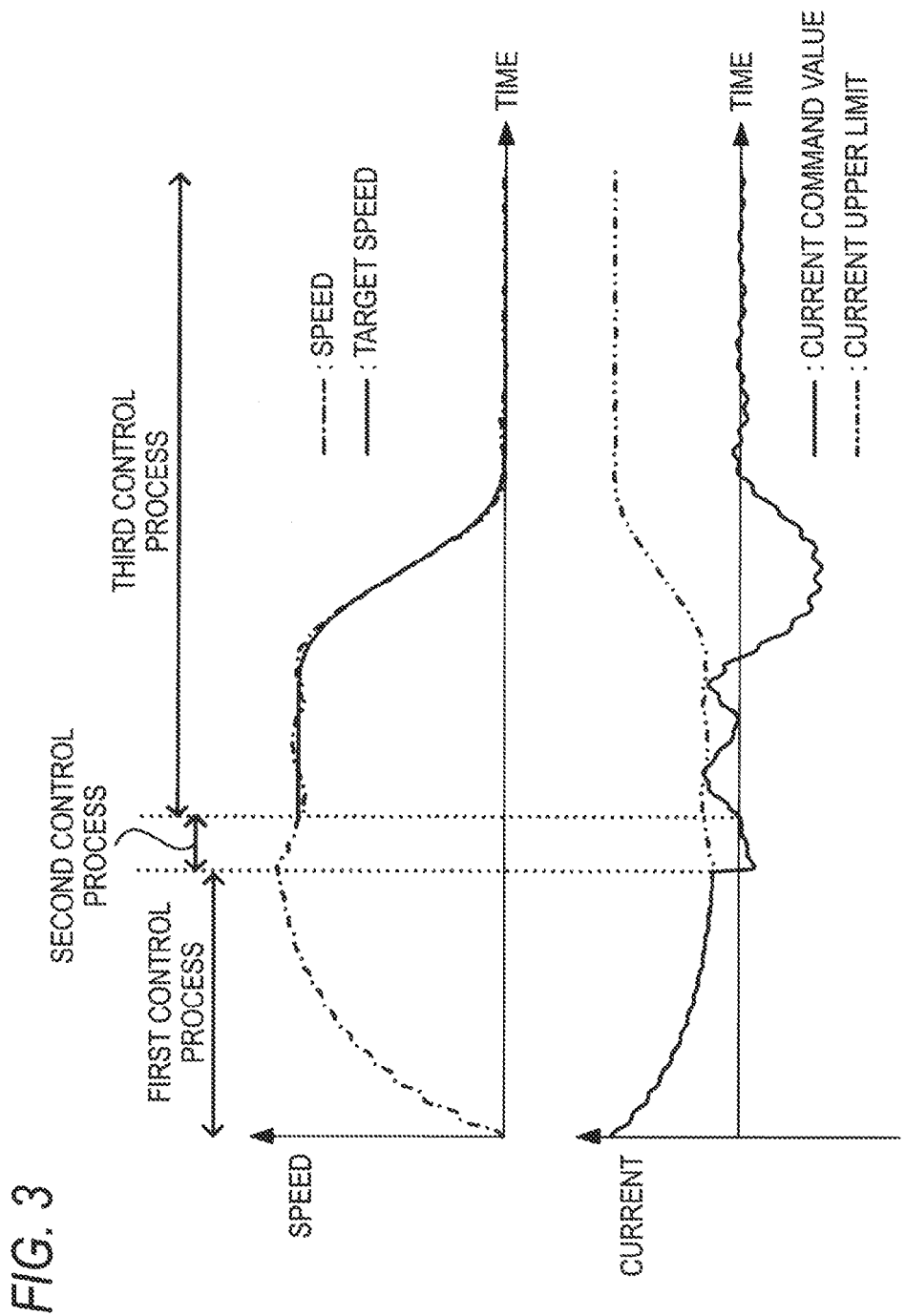
FIG. 3 illustrates graphs representing trajectories of the position, speed, and acceleration of a driven object according to a control method of a first illustrative embodiment.

Further, as shown in FIG. 3, the motor 20 is controlled so that, after the start of the third control process, the driven object 10 is not immediately decelerated, but the driven object 10 is moved at a constant speed and then is decelerated and stopped. At the start of the control based on the target profiles, variations of the position P and speed V of the driven object 10 from the target profiles are large. However, since the constant speed section is provided, it is possible to perform deceleration while suppressing the variations. Therefore, it is possible to stop the driven object 10 at the target stop position Pt with a high degree of accuracy. In case that the constant speed section is provided, the rapidity is slightly deteriorated. Therefore, in some cases, it is possible to consider an example of setting the target profiles without providing the constant speed section.

Next, the details of the main control process which the motor control unit 60 periodically performs when receiving the drive command will be described with reference to FIG. 5. The main control process is for conveying the driven object 10 to the target stop position Pt designated by the drive command, and is performed for each control period.

Figure 5:
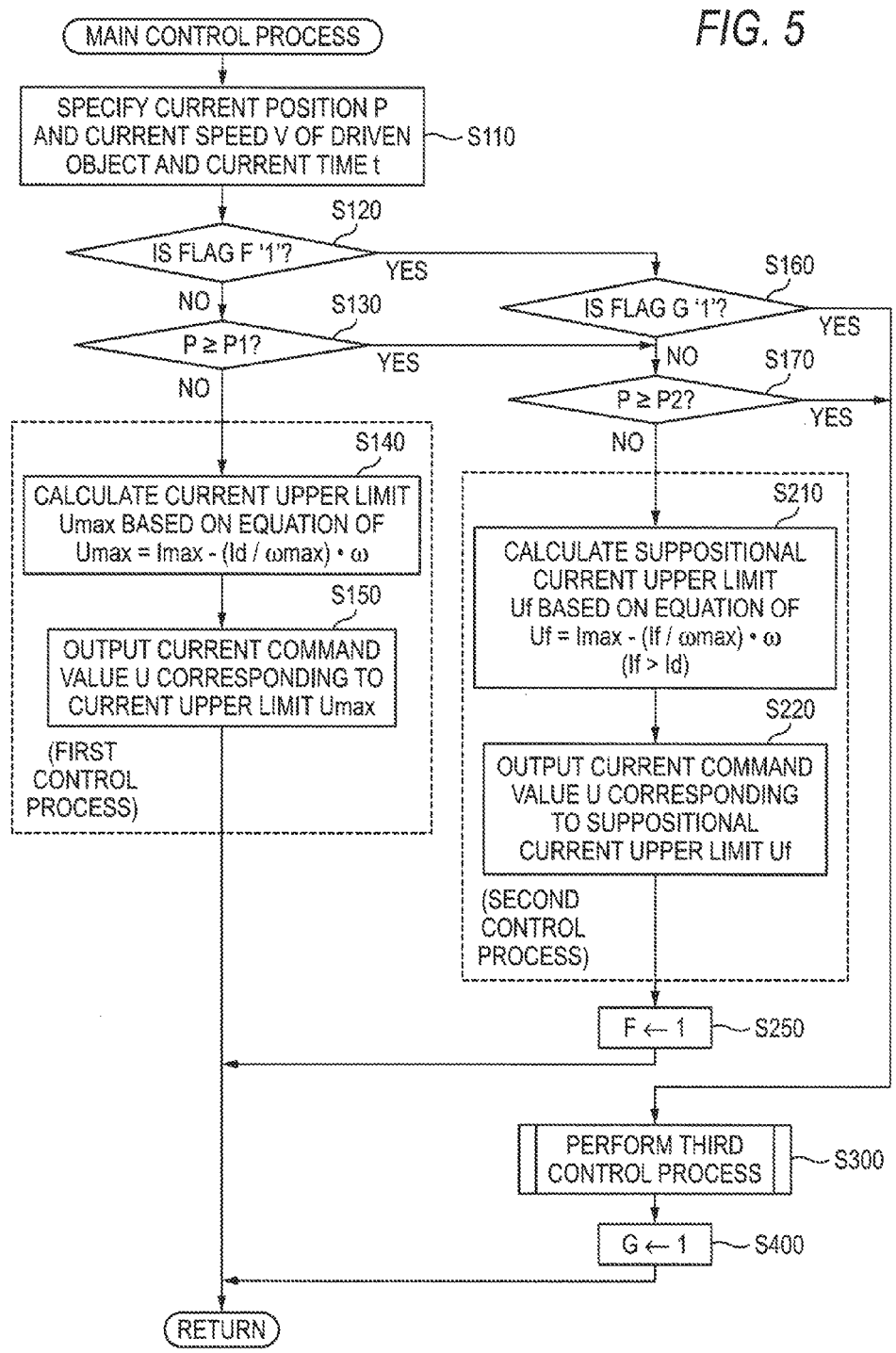
FIG. 5 is a flow chart illustrating a main control process which is performed by a motor control unit.

When the main control process shown in FIG. 5 starts, in step S110, the motor control unit 60 specifies the current position P of the driven object 10 based on the rotation position X of the motor 20 detected by the position detector 50 and specifies the current speed V of the driven object 10 based on the rotation speed ω of the motor 20 detected by the speed detector 55. Further, in step S110, the motor control unit 60 specifies the elapsed time (current time) t from when the drive command was input and the driving control on the driven object 10 starts. Since the motor 20 and the driven object 10 are corresponds to each other, it is possible to specify the position P and speed V of the driven object 10 from the rotation position X and rotation speed ω of the motor 20.

Next, in step S120, the motor control unit 60 determines whether a value of a flag F is 1. The flag F and a flag G (to be described above) are reset to a value of 0 (zero) if the drive command is input. The flag F is set to the value of 1 when the process of step S250 is performed, and the flag G is set to the value of 1 when the process of step S400 is performed.

When it is determined that the value of the flag F is 0 (No in step S120), the motor control unit 60 proceeds to step S130, and when it is determined that the value of the flag F is 1 (Yes in step S120), the motor control unit 60 proceeds to step S160.

When it is proceeded to step S130, the motor control unit 60 determines whether the driven object 10 has reached a first switch position P1, which is a predetermined position to switch from the first control process to the second control process, based on the current position P of the driven object 10 specified in step S110. Specifically, when the position P of the driven object 10 is equal to or greater than the first switch position P1, it is determined that the driven object 10 has reached the first switch position P1.

When it is determined that the driven object 10 has not reached the first switch position P1 (No in step S130), the motor control unit 60 performs the following process as the first control process. In step S140, based on the present rotation speed ω of the motor 20 specified in step S110, the motor control unit 60 calculates the current upper limit Umax corresponding to the present rotation speed ω by the above-mentioned Equation 2. Then, in step S150, the motor control unit 60 inputs the current command value U (=Umax) corresponding to the current upper limit Umax, to the motor driver 30. Next, the motor control unit 60 finishes the main control process, and restarts the main control process from step S110 at the next performance timing coming periodically.

Since the flag F is 0 until the driven object 10 reaches the first switch position P1, the motor control unit 60 performs the main control process periodically, and the first control process is repeatedly performed (steps S140 and S150). In other words, until the driven object 10 reaches the first switch position P1, the main control process is periodically performed so that the motor 20 rotates by the driving current (current amount) corresponding to the current upper limit Umax, so that driven object 10 is conveyed by nearly maximum capability of the motor 20.

On the other hand, when it is determined that the driven object 10 has reached the first switch position P1 (Yes in step S130), the motor control unit 60 proceeds to step S170 in which the motor control unit 60 determines whether the driven object 10 has reached a second switch position P2 which is a predetermined position to switch from the second control process to the third control process. Specifically, when the position P of the driven object 10 is equal to or greater than the second switch position P2, the motor control unit 60 determines that the driven object 10 has reached the second switch position P2.

When it is determined that the driven object 10 has not reached the second switch position P2 (No in step S170), the motor control unit 60 performs the following process as the second control process. In other words, in step S210, based on the present rotation speed ω of the motor 20 specified in step S110, the motor control unit 60 calculates the suppositional current upper limit Uf smaller than the current upper limit Umax corresponding to the present rotation speed ω. Then, in step S220, the motor control unit 60 inputs the current command value U (=Uf) corresponding to the suppositional current upper limit Uf, to the motor driver 30. Next, the motor control unit 60 sets the flag F to the value of 1 in step S250, and stops the main control process.

In the main control process which is performed after the second control process (steps S210 and S220) are performed for the first time, the motor control unit 60 performs positive determination in step S120, thereby proceeding to step S160, and determines whether the value of the flag G is 1, in step S160. Since the flag G is not set to the value of 1 until the driven object 10 reaches the second switch position P2, the motor control unit 60 performs negative determination (No in step S160) and proceeds to step S170.

Therefore, until the driven object 10 reaches the second switch position P2, the motor control unit 60 performs the main control process periodically, and thus the second control process is repeatedly performed (steps S210 and S220). In other words, until the driven object 10 reaches the second switch position P2, the main control process is periodically performed so that the motor 20 rotates by the driving current (current amount) corresponding to the suppositional current upper limit Uf, and the driving current input to the motor 20 is adjusted to a value smaller than the current upper limit Umax.

On the other hand, when it is determined that the driven object 10 has reached the second switch position P2 (Yes in step S170), the motor control unit 60 proceeds to step S300 in which the motor control unit 60 performs the third control process. After performing the third control process, the motor control unit 60 sets the flag G to the value of 1 in step S400, and finishes the main control process.

In the main control process, which is performed after the third control process (step S300) is performed first, the motor control unit 60 performs positive determination in steps S120 and S160, thereby proceeding to step 300.

Therefore, if the driven object 10 reaches the second switch position P2, the motor control unit 60 performs the main control process periodically, and thus the third control process is repeatedly performed (step S300). The motor control unit 60 repeatedly performs the third control process, and when the driven object 10 stops at the target stop position Pt, the motor control unit 60 finishes performing the main control process periodically.

Figure 6:
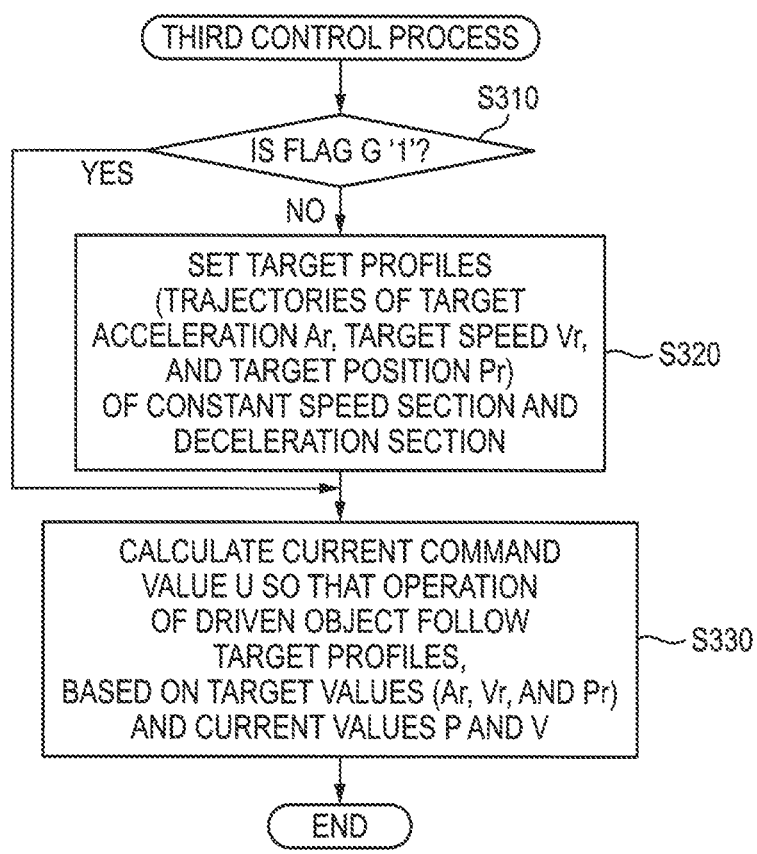
FIG. 6 is a flow chart illustrating a third control process performed in the main control process.

Next, the details of the third control process performed in step S300 will be described with reference to FIG. 6. In the third control process, in step S310, the motor control unit 60 determines whether the value of the flag G is 1. When it is determined that the value of the flag G is not 1 (No in step S310), the motor control unit 60 proceeds to step S320 in which the motor control unit 60 sets the target profiles of the constant speed section and the deceleration section. On the other hand, when it is determined that the value of the flag G is 1 (Yes in step S310), the motor control unit 60 proceeds to step S330. In other words, in the first-time third control process, the motor control unit 60 performs the process of step S330 based on the set target profiles after setting the target profiles of the constant speed section and the deceleration section in step S320, and in the second-time third control process, the motor control unit 60 performs the process of step S330 based on the target profiles set in the first-time third control process without performing the process of step S320.

Specifically, in step S320, the motor control unit 60 calculates the deceleration distance Pd (=Vm$^2$/Ap) based on the current speed V (=Vm) of the driven object 10 specified in step S110, and then the motor control unit 60 calculates the time length Tc (=Pt−Pd−Pm) of the constant speed section optimal to stop the driven object 10 at the target stop position Pt, based on the deceleration distance Pd, the current position P (=Pm) of the driven object 10 specified in step S110 and the target stop position Pt. Then, the motor control unit 60 sets the deceleration time period Tb as Tb=Ta+Tc by adding the time length Tc of the constant speed section to the current time t (=Ta), sets the target profiles of the constant speed section according to Equations 4 to 6 based on the values Pm, Vm, Ta, and Tb, and sets the target profiles of the deceleration section according to Equations 7 to 10 based on the value Ap set in advance.

When it is proceeded to step S330, based on the target values (the target acceleration Ar, the target speed Vr, and the target position Pr) at the current time t according to the target profiles, and the position P and speed V of the driven object 10 specified in step S110, the motor control unit 60 calculates the current command value U for the motor 20 so that the position P and speed V of the driven object 10 follow the target values, and inputs the calculated current command value U to the motor driver 30. Next, the motor control unit 60 finishes the third control process and proceeds to step S400.

When the driven object 10 reaches the second switch position P2, the motor control unit 60 repeatedly performs the third control process of step S300 having the above-mentioned configuration, thereby controlling the motor 20 according to the target profiles so that the driven object 10 stops at the target stop position Pt. When the driven object 10 stops at the target stop position Pt, the motor control unit 60 finishes performing the periodic main control process. Further, in case that the position P of the driven object 10 obtained from the position detector 50 does not change for a predetermined time period, the motor control unit 60 may determines that the driven object 10 has stopped and finish the periodic process.

The configuration of the control system 1 of the first illustrative embodiment is described in the above. in case that the motor control is switched from the first control process to the third control process which is an control based on the target profiles, the second control process is performed so that the motor 20 is driven by a current amount smaller than the current upper limit Umax immediately before the third control process is performed.

Therefore, immediately after the third control process is performed, it is possible to suppress the load on the motor 20 from increasing caused by the current command value U exceeding the current upper limit Umax due to the current saturation. Further, it is possible to suppress the stop accuracy of the driven object 10 from deteriorating caused by the driven object 10 being not conveyed on a trajectory as the target profiles due to current saturation.

Furthermore, it is possible to perform smooth switching between the first, second, and third control processes such that the operation of the driven object 10 does not be greatly discontinuous, it is possible to perform the deceleration of the driven object 10 at a desired control state, and it is possible to accurately stop the driven object 10 at the target stop position Pt.

since it is possible to convey the driven object 10 at high speed by the first control process as described above, it is possible to stop the driven object 10 at the target stop position Pt at high speed with a high degree of accuracy.

when the position of the driven object 10 reaches the first switch position or the second switch position, switching of the first, second, and third control processes is performed. However, the control system 1 may be configured to perform the switching in response to the time from the start of the driving or the speed of the driven object.

Meanwhile, the first switch position and the second switch position are experimentally obtained in advance. Specifically, when the first control process is performed as long as possible, it is possible to more rapidly move the driven object 10. However, when the first control process is performed too long, a distance to perform the third control process shortens, and thus the driven object 10 may not accurately stop at the target stop position Pt. For this reason, it is preferable to set the first switch position so that the driven object 10 is accurately stopped at the target stop position Pt by the third control process. When obtaining value If, it is possible to experimentally obtain, a position as the second switch position, at which the rotation speed of the motor is reduced so that the current command value U calculated by the third control process does not exceeds the current upper limit Umax.

Second Illustrative Embodiment

Figure 7:
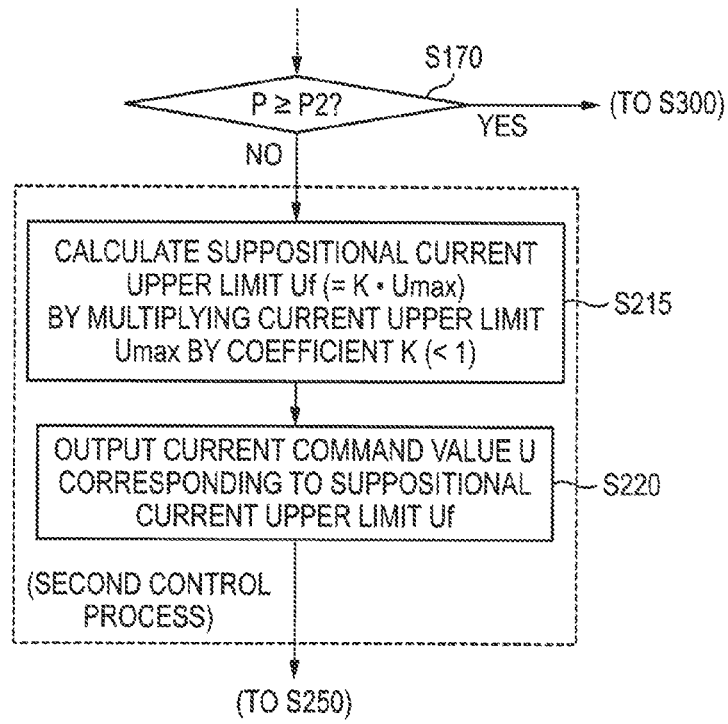
FIG. 7 is a flow chart illustrating a second control process which is performed in a second illustrative embodiment.

Next, a second illustrative embodiment will be described. A control system 1 of the second modification has the same configuration as the first illustrative embodiment except for the configuration of the second control process performed by the motor control unit 60, and thus a description of configurations other than the second control process will be appropriately omitted. FIG. 7 selectively illustrates steps regarding the second control process of the second illustrative embodiment and the previous-and-next steps of the second control process, in the main control process.

In the second illustrative embodiment, similarly to the first illustrative embodiment, if the driven object 10 reaches the first switch position P1 (Yes in step S130), the motor control unit 60 proceeds to step S170. In step S170, the motor control unit 60 determines whether the driven object 10 has reached the second switch position P2. When it is determined that the driven object 10 has not reached the second switch position P2 (No in step S170), the motor control unit 60 performs the following process different from the first illustrative embodiment, as the second control process. Specifically, according to a function $U(\omega)$ shown Equation 1 or 2, the motor control unit 60 calculates the current upper limit Umax $(=U(\omega))$ corresponding to the present rotation speed $\omega$ of the motor 20 specified in step S110. Then, in step S215, the motor control unit 60 calculates the suppositional current upper limit Uf $(=K \cdot Umax)$ smaller than the current upper limit Umax by multiplying the current upper limit Umax by a coefficient K of less than 1 set in advance.

Next, in step S220, the motor control unit 60 inputs a current command value U $(=Uf)$ corresponding to the suppositional current upper limit Uf calculated in step S215, to the motor driver 30 so that the motor 20 is driven by a driving current smaller than the current upper limit Umax. Then, the motor control unit 60 proceeds to step S250.

In other words, in the second illustrative embodiment, the process of step S215 is performed to calculate a certain ratio of the current upper limit Umax as the suppositional current upper limit Uf, instead of the process of step S210 of the first illustrative embodiment. Then, the motor control is performed based on the suppositional current upper limit Uf. Therefore, the motor is driven by a driving current smaller than the current upper limit Umax, similarly to the processes of steps S210 and S220 of the first illustrative embodiment.

According to the control system 1 of the second illustrative embodiment having the above-mentioned configuration, because of the same reasons as the control system 1 of the first illustrative embodiment, it is possible to stop the driven object 10 at the target stop position at high speed with a high degree of accuracy. In the second illustrative embodiment, in step S215, the suppositional current upper limit Uf is calculated based on the rotation speed $\omega$ at that time. However, the suppositional current upper limit Uf may be set to a certain ratio K of the current upper limit Umax calculated in the previous first control process of the second control process. In other words, in step S215, the suppositional current upper limit Uf $(=K \cdot Umax)$ may be calculated by using the current upper limit Umax calculated in the previous first control process of the second control process (a modified second illustrative embodiment).

Third Illustrative Embodiment

Figure 8:
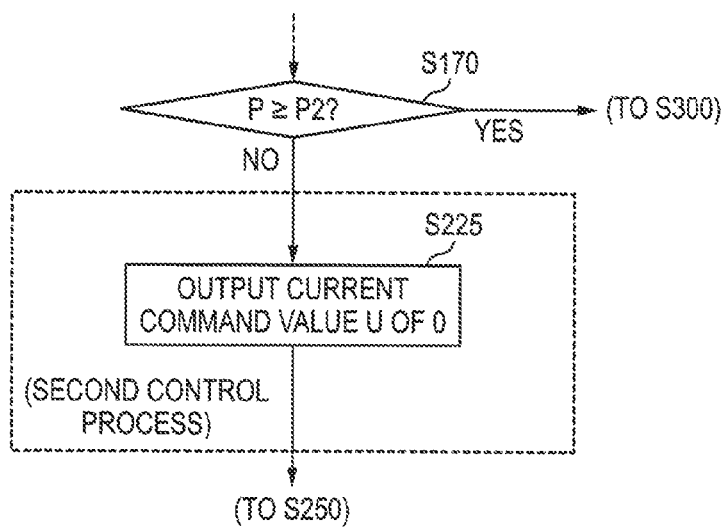
FIG. 8 is a flow chart illustrating a second control process which is performed in a third illustrative embodiment.

Next, a third illustrative embodiment will be described. Similarly to the second illustrative embodiment, a control system 1 of the second modification has the same configuration as the first illustrative embodiment except for the configuration of the second control process performed by the motor control unit 60. FIG. 8 selectively illustrates steps regarding the second control process of the third illustrative embodiment and the previous-and-next steps of the second control process, in the main control process.

Similarly to the first illustrative embodiment, when the driven object 10 reaches the first switch position P1 (Yes in step S130), the motor control unit 60 of the third illustrative embodiment proceeds to step S170 in which the motor control unit 60 determines whether the driven object 10 has reached the second switch position P2. When it is determined that the driven object 10 has not reached the second switch position P2 (No in step S170), as the second control process, the motor control unit 60 inputs the current command value U of 0 to the motor driver 30 in step S225, instead of the steps S210 and S220. Then, the motor control unit 60 proceeds to step S250.

Figure 9:
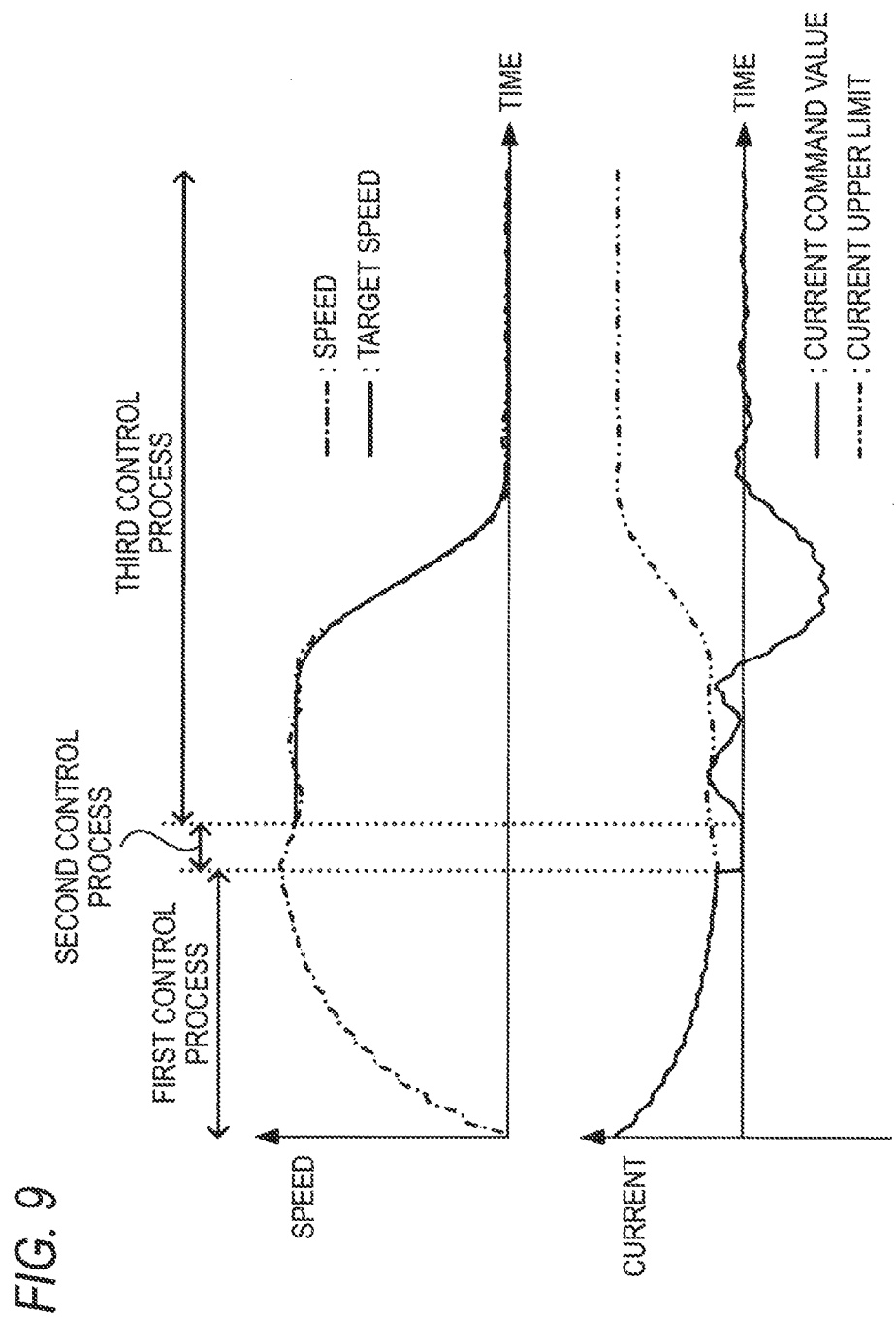
FIG. 9 illustrates graphs representing trajectories of the position, speed, and acceleration of a driven object according to a control method of the third illustrative embodiment.

According to the control system 1 of the third illustrative embodiment, when the second control process is performed, as shown in FIG. 9, the speed V of the driven object 10 decreases and the current upper limit Umax increases. Therefore, in the third control process, it is possible to perform the motor control so that the current command value U calculated in the third control process does not exceed the current upper limit Umax even if the load on the motor 20 or the like increases after the third control process. Therefore, similarly to the control system 1 of the first illustrative embodiment, it is possible to stop the driven object 10 at the target stop position Pt at high speed with a high degree of accuracy.

Fourth Illustrative Embodiment

Next, a fourth illustrative embodiment will be described. A control system 1 of the second modification has the same configuration as the control system 1 of the first illustrative embodiment except for the third control process of step S300. Therefore, the configuration of the third control process will be selectively described below with reference to FIGS. 10 and 11. The configuration of the third control process of the third illustrative embodiment may be applied to the control systems 1 of the first illustrative embodiment and the second illustrative embodiment.

Figure 10:
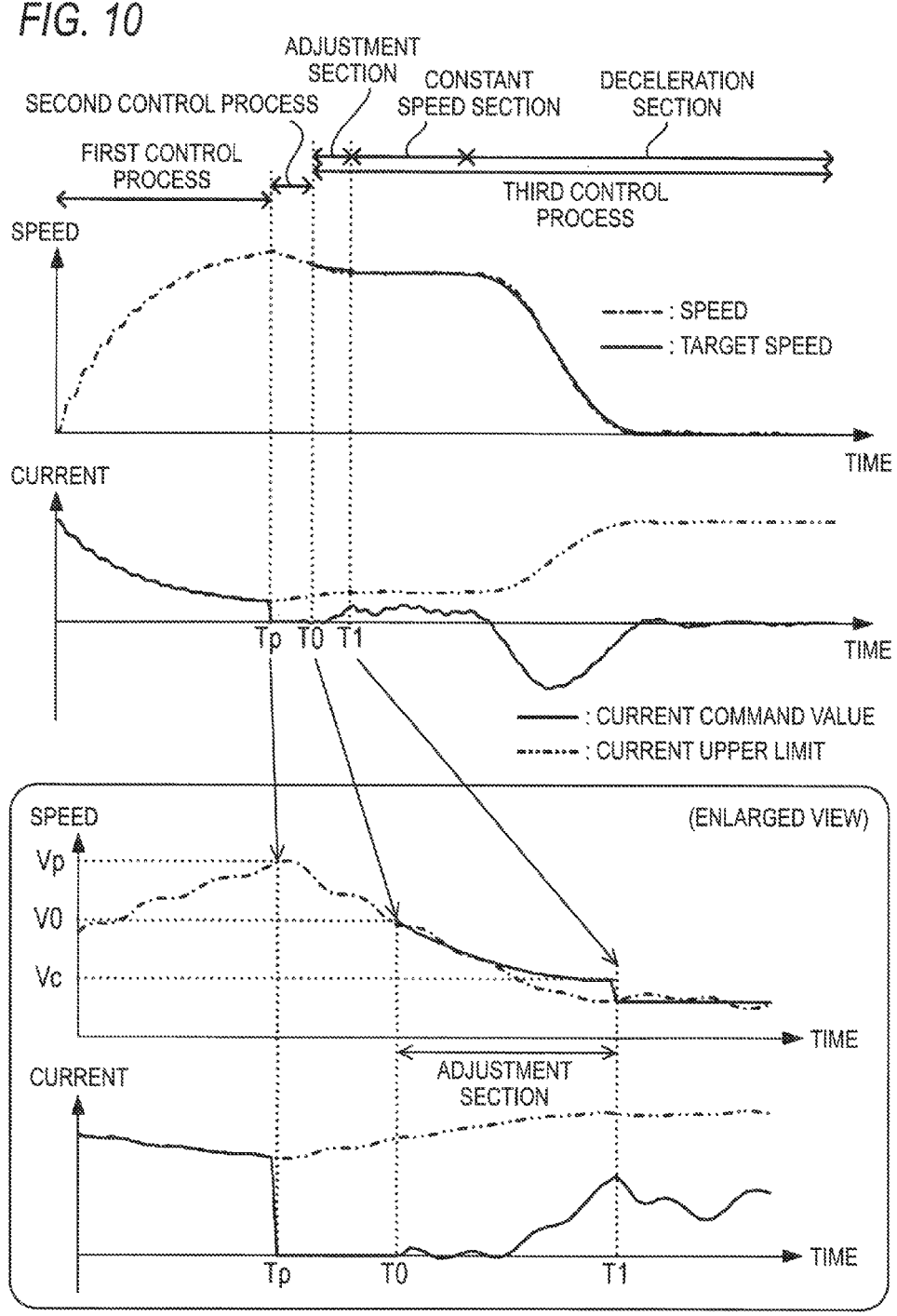
FIG. 10 illustrates graphs representing trajectories of the position, speed, and acceleration of a driven object according to a control method of a fourth illustrative embodiment.

As shown in FIG. 10, the third control process uses the target profiles having an adjustment section before the constant speed section. The lower portion of FIG. 10 illustrates an enlarged view of a graph of time-speed (the target speed Vr and the actual speed V) and a graph of time-current (the current command value U and the current upper limit Umax) immediately after switching from the second control process to the third control process.

The adjustment section unit a section where the driven object 10 is decelerated, and thus is similar to the deceleration section. However, the adjustment section is different from the deceleration section for stopping the driven object 10 in that the adjustment section is provided for setting the speed in the constant speed section to be low.

In the fourth illustrative embodiment, when the third control process starts, based on the speed V $(=V0)$, position P $(=P0)$, and acceleration A $(=A0)$ of the driven object 10 at that time, and the current time t $(=T0)$, the motor control unit 60 sets the target profiles to be used in the adjustment section. Specifically, the profile of the target speed Vr is set according to the following equation.

[Equation 7]

$$V_r = \frac{A_0}{2 \cdot (T_0 - T_1)} \cdot (t - T_1)^2 + V_c \quad (11)$$

$$T_1 = \frac{2 \cdot (V_0 - V_c)}{A_0} + T_0 \quad (12)$$

Here, the reference symbol 'T1' represents the end time of the adjustment section, and the reference symbol 'Vc' represents a target speed at the end of the adjustment section. The target speed Vc may be determined as a fixed value in advance or as a ratio Rc of the speed V (=Vp) of the driven object 10 at the switching time t (=Tp) from the first control process to the second control process. In other words, the ratio Rc may be determined in advance, and when the profile is set based on the ratio Rc, the target speed Vc may be set by an equation of (Vc=Vp·Rc). However, it is required to determine the target speed Vc or the ratio Rc so that the target speed Vc is smaller than the speed V (=V0) of the driven object 10 at the start time t (=T0) of the adjustment section. Alternatively, the ratio Rc may be a variable value. In other words, the motor control unit 60 may calculate a ratio R0 (=V0/Vp) by the speed V (=V0) of the driven object 10 at the start time t (=T0) of the adjustment section and the speed V (=Vp) of the driven object 10 at the start time t (=Tp), and determine the ratio Rc to a value smaller than the ratio R0. For example, a certain ratio of the ratio R0 may be set as the ratio Rc. If the target speed Vc is calculated using the ratio Rc, it is guaranteed that the target speed Vc becomes smaller than the speed V (=V0) of the driven object 10 at the start time t (=T0) of the adjustment section.

Since the target speed Vr are set by the above-mentioned equation, the profiles of the target acceleration Ar and the target position Pr in the adjustment section may be set according to the following equation.

[Equation 8]

$$A_r = \frac{dV_r}{dt} \quad (13)$$

$$P_r = \int_{T_0}^{T_1} V_r dt + P_0 \quad (14)$$

As described in above-mentioned equation, in the target profiles of the adjustment section, the target acceleration Ar at the time T0 which is the start time of the adjustment section is the same value as the acceleration A0 of the driven object 10 at that time, the target speed Vr at the time T0 is the same value as the speed V0 of the driven object 10 at that time, and the target position Pr at the time T0 is the same as the position P0 of the driven object 10 at that time. Further, in the target profiles, the target acceleration Ar at the end time T1 of the adjustment section is 0, the target speed Vr at the end time T1 of the adjustment section is the target speed Vc, and the target speed Vr monotonically decreases from the start time T0 to end time T1 of the adjustment section. In the fourth illustrative embodiment, those target profiles are used so that the speed V of the driven object 10 smoothly decreases to the target speed Vc in the adjustment section. Therefore, the current upper limit Umax increases.

Figure 11:
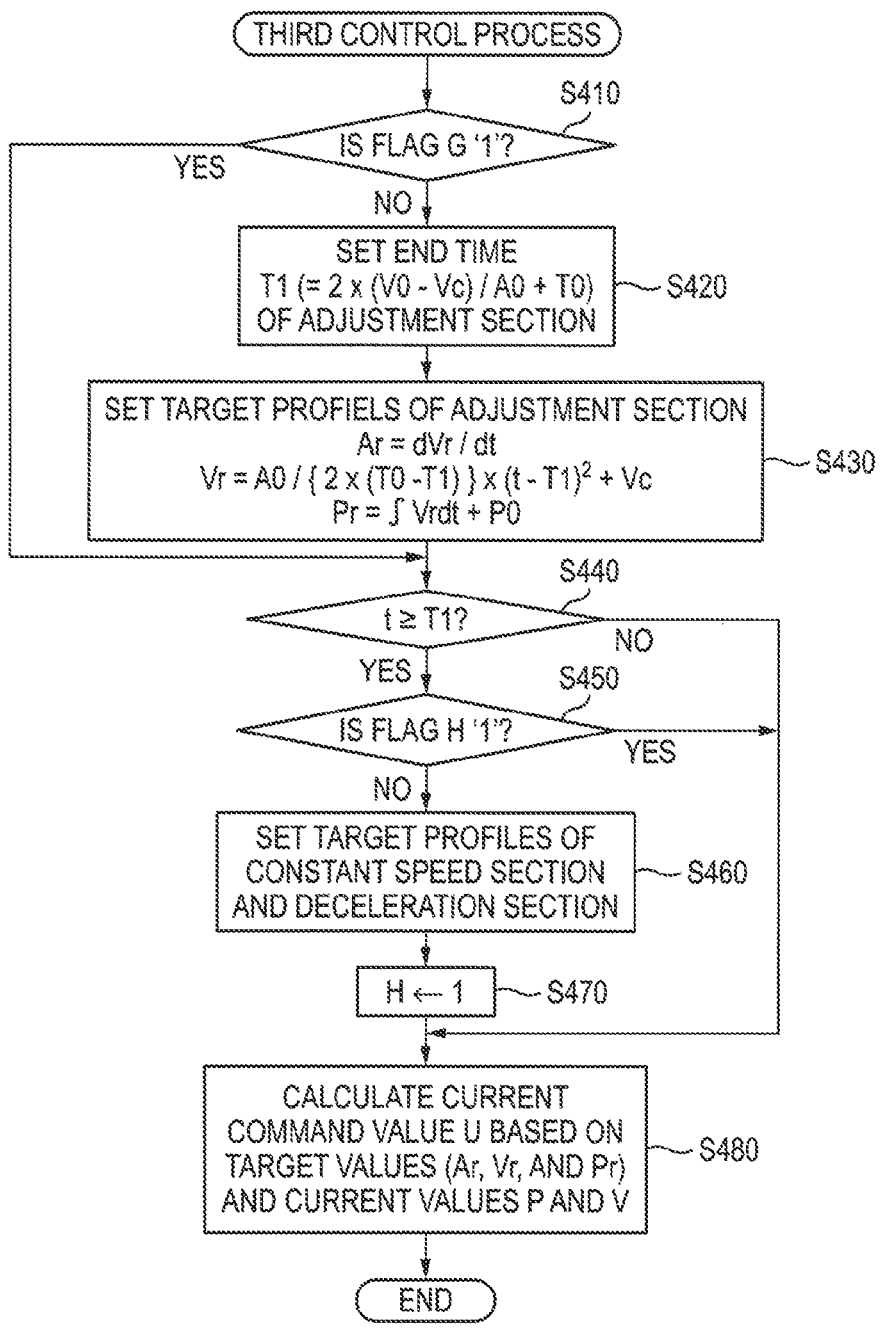
FIG. 11 is a flow chart illustrating a third control process which is performed in the fourth illustrative embodiment.

Next, the details of the third control process will be described with reference to FIG. 11. When the third control process is started in step S300 (see FIG. 5), in step S410, similarly to the above-mentioned illustrative embodiments, the motor control unit 60 determines whether the value of the flag G is 1. When it is determined that the value of the flag G is not 1 (No in step S410), in step S420, based on the current speed V (=V0) of the driven object 10 specified in step S110, the acceleration A (=A0) based on the speed V (=V0), and the current time t (=T0), the motor control unit 60 sets the end time T1 of the adjustment section.

The acceleration A (=A0) may be calculated based on the speed specified in step S110 in a current time and the speeds specified in step S110 in a previous time. For example it is possible to calculate the acceleration A (=A0) by dividing a difference between the speed V (=V0) currently specified in step S110 and a speed V (=Vz) previously specified in step S110 by the performance period (sampling period) of the main control process. This operation may be implemented by storing the all or a portion of the speeds specified in step S110 every time, in a storage medium (such as a RAM) of the motor control unit 60. This configuration is similarly applied to the case of calculating the target speed Vc by a ratio Rc of the above-mentioned speed Vp.

When the process of step S420 finishes, in step S430, the motor control unit 60 sets the target profiles of the adjustment section in accordance with Equations 11, 13, and 14. Then, the motor control unit 60 proceeds to step S440. On the other hand, it is determined in step S410 that the value of the flag G is 1 (Yes in step S410), the motor control unit 60 proceeds to step S440, without performing the process of step S430. Similarly to the above-mentioned illustrative embodiments, the flag G is set to 1 in step S400 after the third control process is performed.

In step S440, the motor control unit 60 determines whether the end time T1 of the adjustment section has come. Specifically, the motor control unit 60 determines whether the current time t specified in step S110 is equal to or greater than the end time T1 of the adjustment section and thus determines whether the end time T1 of the adjustment section has come. When it is determined that the end time T1 of the adjustment section has not come (No in step S440), the motor control unit 60 proceeds to step S480. In step S480, the motor control unit 60 calculates the current command value U for the motor 20, based on the target values (the target acceleration Ar, the target speed Vr, and the target position Pr) at the current time t specified based on the target profiles of the adjustment section set in step S430 and the position P and speed V of the driven object 10 specified in step S110, so that the position P and speed V of the driven object 10 follow the target values, and then the motor control unit 60 inputs the calculated current command value U to the motor driver 30. Then, the motor control unit 60 finishes the third control process.

As described above, after the driven object 10 reaches the second switch position P2, the motor control unit 60 repeatedly perform the third control process until the end time T1 of the adjustment section comes, so that the speed V of the driven object 10 first decreases to about the target speed Vc in accordance with the target profiles of the adjustment section, and after that the current upper limit Umax is increased.

When the end time T1 of the adjustment section comes, the motor control unit 60 performs positive determination in step S440 and determines whether the value of a flag H is 1, in step S450. The flag H is set to 0 if the drive command is input, and the flag H is set to 1 if step S470 is performed. Therefore, immediately after the end time T1 of the adjustment section comes, in the third control process, the motor control unit 60 determines that the value of the flag H is 0 (No in step S450) and proceeds to step S460.

In step S460, similarly to the process of step S320 of the first to third illustrative embodiments, the motor control unit 60 sets the target profiles of the constant speed section and the deceleration section. In other words, in step S460, the motor control unit 60 calculates the deceleration distance Pd ($=Vm^2/Ap$) using the current speed V ($=Vm$) of the driven object 10 specified in step S110, and calculates the time length Tc ($=(Pt-Pd-Pm)/Vm$) of the constant speed section preferably to stop the driven object 10 at the target stop position Pt, based on the deceleration distance Pd, the current position P ($=Pm$) of the driven object 10 specified in step S110, and the target stop position Pt. Then, the motor control unit 60 sets the deceleration time period Tb as Tb=Ta+Tc by adding the time length Tc of the constant speed section to the current time t ($=Ta$), sets the target profiles of the constant speed section according to Equations 4 to 6 based on the values Pm, Vm, Ta, and Tb, and sets the target profiles of the deceleration section according to Equations 7 to 10 based on the predetermined value Ap.

As described above, when the target profiles of the constant speed section and the adjustment section are set, the motor control unit 60 sets the flag H to 1 in step S470 and then proceeds to step S480. After setting the flag H to 1, in step S480, the motor control unit 60 calculates the current command value U for the motor 20, based on the target values (the target acceleration Ar, the target speed Vr, and the target position Pr) at the current time t specified by the target profiles of the constant speed section and the deceleration section and the position P and speed V of the driven object 10 specified in step S110 so that the position P and speed V of the driven object 10 follow the target values, and then the motor control unit 60 inputs the calculated current command value U to the motor driver 30. Then, the motor control unit 60 finishes the third control process.

As described above, after the end time T1 of the adjustment section comes, the motor control unit 60 repeatedly performs the third control process to control the driven object 10 in accordance with the target profiles of the constant speed section and the deceleration section, so that the driven object 10 is decelerated and stops at the target stop position Pt. After the flag H is set to 1, in the third control process, the motor control unit 60 performs positive determination in steps S440 and S450 and skips the processes of steps S460 and S470 to perform the process of step S480.

The fourth illustrative embodiment is described in the above. Even in the fourth illustrative embodiment, it is possible to stop the driven object 10 at high speed with a high degree of accuracy. Specifically, since the adjustment section is provided, it is possible to adjust the speed in the constant speed section without depending on the speed at the end of the second control process, and it is possible to more efficiently suppress the current command value U calculated in the third control process from exceeding the current upper limit Umax due to an increase of the load.

Fifth Illustrative Embodiment

Next, a fifth illustrative embodiment will be described. The control system 1 of the fifth illustrative embodiment is configured to determine whether there is an increase of the load and determine whether to perform the second control process in accordance with the result of the determination on an increase of the load. Since the second control process may deteriorate the performance of high-speed conveyance, in case that it is necessary to prioritize the high-speed conveyance than the stop accuracy and the load is unlikely to increase so that the current command value U does not exceed the current upper limit Umax in the third control process even if the second control process is not performed, it is preferable to omit the second control process. Therefore, the motor control unit 60 determines whether there is an increase of the load, and determines whether to perform the second control process in accordance with the result of the determination on an increase of the load.

Specifically, a configuration of an ink-jet printer 200, in which the load rapidly increases at a specific point, will be described below as an image forming apparatus including the control system of the fifth illustrative embodiment, with reference to FIG. 12, and the details of the process which is performed by the motor control unit 60 will be described with reference to FIGS. 13A and 13B. Similarly to the second to fourth illustrative embodiments, the hardware configuration of the control system 1 of this disclosure is the same as the hardware configuration of the first illustrative embodiment. In other words, the control system 1 of the fifth illustrative embodiment is different from the above-mentioned illustrative embodiments only in the configuration of the process performed by the motor control unit 60. Therefore, a description of the same or similar components to the above-mentioned illustrative embodiments will be appropriately omitted.

Figure 12:
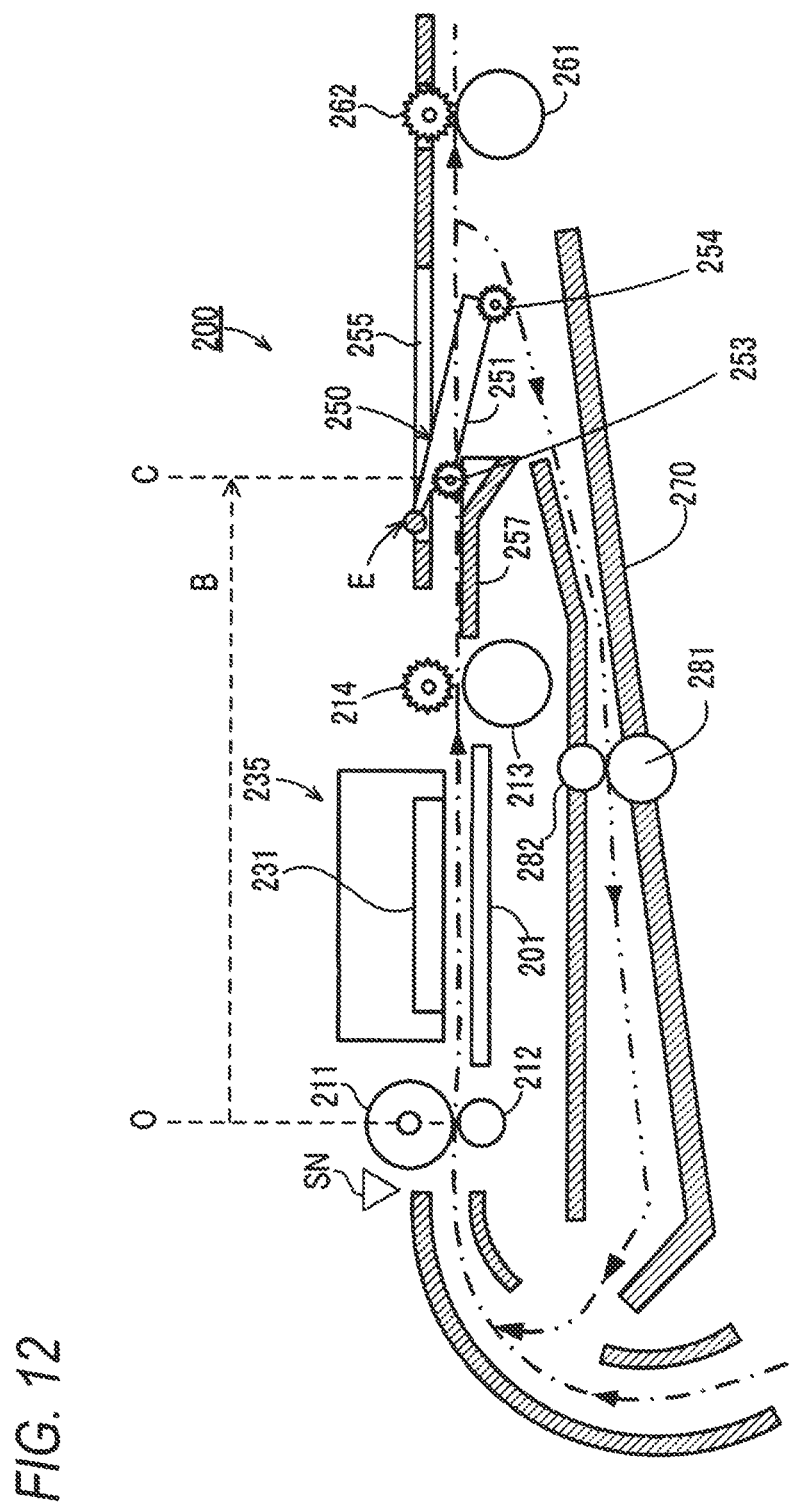
FIG. 12 is a view illustrating a configuration of an ink-jet printer.

Similarly to the ink-jet printer 100 (see FIG. 2) described in the first illustrative embodiment, the ink-jet printer 200 shown in FIG. 12 includes a conveyance roller 211 and a pinch roller 212 disposed upstream of a platen 201, and a discharging roller 213 and a spur roller 214 disposed downstream of the platen 201. Further, the ink-jet printer 200 includes a recording head (a so-called ink-jet head) 231 capable of image forming on a sheet, and a carriage 235 for conveying the recording head 231, which are disposed on the platen 201. In the ink-jet printer 200, the sheet is conveyed as shown by a dashed dotted line by the rotation of the conveyance roller 211 and the discharging roller 213.

Although not shown, similarly to the ink-jet printer 100, the ink-jet printer 200 includes a motor for driving the conveyance roller 211 and the discharging roller 213, a motor control unit for controlling the motor, and a main control unit for performing integrated control on the entire ink-jet printer 200 by inputting a command to each of the internal units of the ink-jet printer such as the motor control unit. Further, similarly to the first illustrative embodiment, it is possible to assemble the components (components within a dotted line of FIG. 1) of the control system 1 other than the driven object 10 and the motor 20, as the motor control unit 140, in the ink-jet printer 200.

In addition to the identical components to those of the above-mentioned ink-jet printer 100, the ink-jet printer 200 includes a path switching unit 250, a downstream roller 261, a spur roller 262, a return path 270, a return roller 281, and a pinch roller 282 disposed to face the return roller 281.

The path switching unit 250 includes a flap 251, and auxiliary rollers 253 and 254, and the flap 251 is configured to be rotatable around a shaft E. Specifically, the flap 251 is rotatably disposed, so that the flap 251 is inclined downwardly shown in FIG. 12 as a first posture and the flap 251 is accommodated to a flap container 255 in vertical posture as a second posture. When a lead end of the sheet supported by a supporting member 257 on the downstream side of the discharging roller 213 passes between the auxiliary roller 253 attached to the flap 251 and the supporting member 257, the flap 251 is pushed upward by the sheet to take the second posture. The sheet moves between the downstream roller 261 and the spur roller 262 while pushing up the flap 251 by a force from the discharging roller 213, and is nipped between the downstream roller 261 and the spur roller 262, and thus the sheet is further conveyed downstream. The downstream roller 261 receives a driving force from the same motor as force for the discharging roller 213, so that the conveyance roller 211 and the discharging roller 213 rotate in synchronization with each other.

Then, when the sheet is conveyed downstream, after the rear end of the sheet passes through between the auxiliary roller 253 and the supporting member 257, the sheet is not supported by the supporting member 257 and is pushed down by the flap 251, and then the rear end of the sheet falls toward the return path 270. Therefore, the flap 251 changes to the first posture.

The main control unit of the ink-jet printer 200 specifies a state, in which the rear end of the paper has fallen toward the return path 270, based on information on a paper conveyance amount. Then, in case that duplex printing is required, the main control unit inputs a command to the motor control device so that the motor rotates reversely. When receiving the command, the motor control device rotates the motor reversely, so that the rear end of the sheet is conveyed towards the return roller 281 and the pinch roller 282. If this conveyance continues, as shown by the dashed dotted line in FIG. 12, the paper turns over so that the rear end is directed to the conveyance direction. In this state, the sheet is conveyed between the conveyance roller 211 and the pinch roller 212. Then, when the sheet reaches between the conveyance roller 211 and the pinch roller 212, a drive command for instructing to rotate the motor normally is input from the main control unit, and the sheet is conveyed similarly to simplex printing, and thus the sheet is finally discharged to a discharge tray.

In the ink-jet printer 200 capable of that duplex printing, as the lead end of the sheet pushes the flap 251 upwardly, the conveyance load varies greatly. In other words, when the lead end of the sheet pushes the flap 251 upwardly, the conveyance load increases greatly, and thus the load on the motor also increases greatly.

Figure 13A:
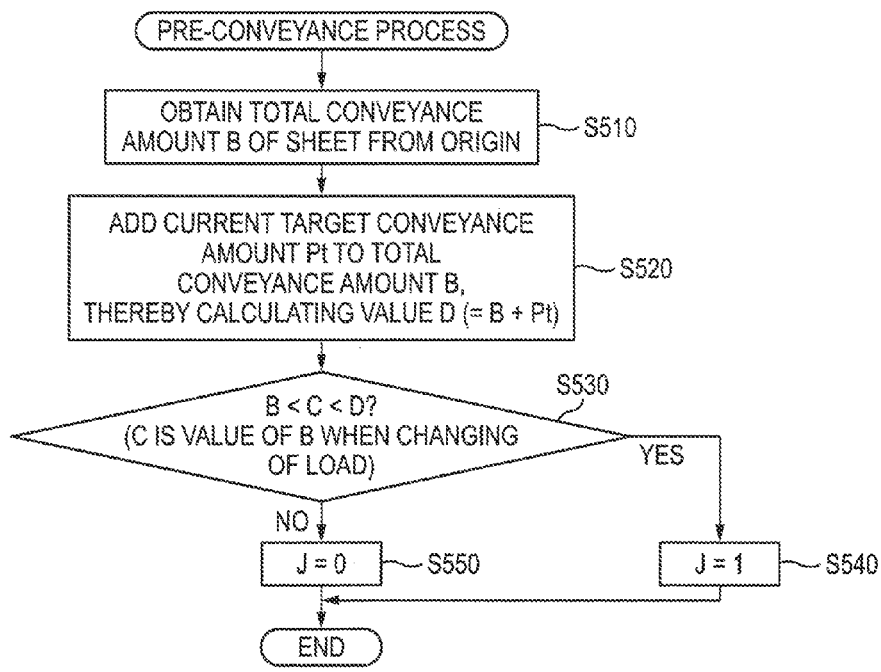
FIG. 13A is a flow chart illustrating a pre-conveyance process which is performed by a motor control unit 60 in a fifth illustrative embodiment.
Figure 13B:
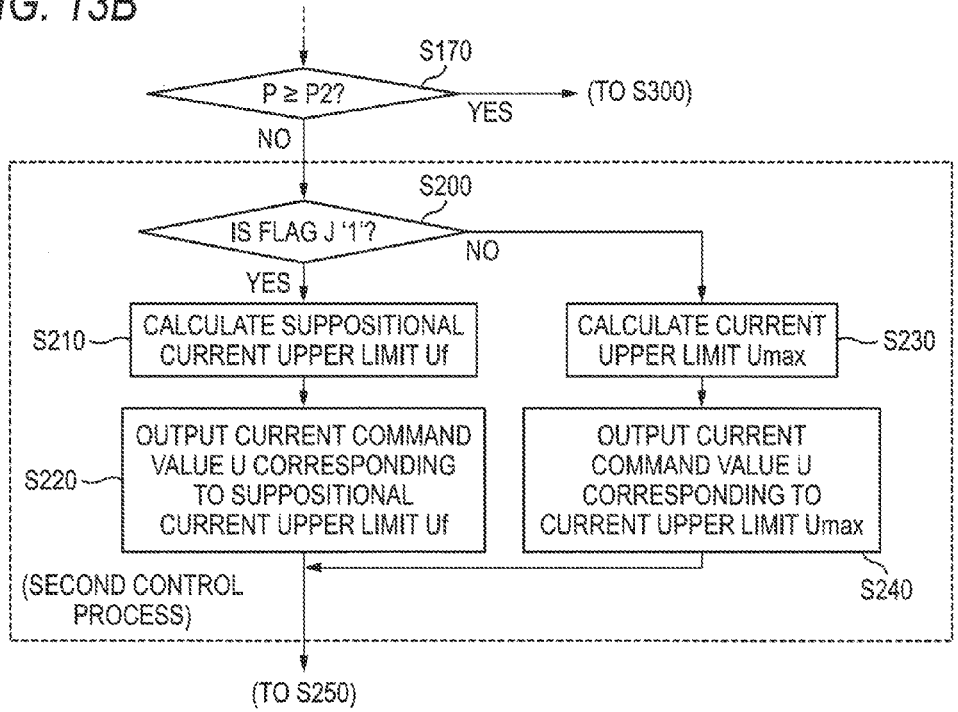
FIG. 13B is a flow chart illustrating a second control process of the fifth illustrative embodiment.

For this reason, when the drive command is received from the main control unit, the motor control unit 60 of the control system 1 of this disclosure incorporated in the ink-jet printer 200 performs a pre-conveyance process shown in FIG. 13A before performing the main control process repeatedly.

When the pre-conveyance process is started, in step S510, the motor control unit 60 acquires information of the total conveyance amount B of the sheet from an origin position O (see FIG. 12) at the present time from the main control unit. In other words, in the ink-jet printer 200, in order to convey one sheet, the drive command designating the target conveyance amount (target stop position) Pt is plurally input from the main control unit to the motor control unit 60. Therefore, in step S510, the motor control unit 60 obtains the information on the total conveyance amount B of the sheet being conveyed from when the lead end of the sheet in conveyance has passed the origin position O in accordance with the previous drive commands, from the main control unit.

In the ink-jet printer 200, similarly to known image forming apparatuses, a sensor SN for detecting an end of a sheet is provided just before the conveyance roller 211, and it is possible to detect that the lead end of the sheet has reached the origin position O based on an input signal from the sensor SN. In the present illustrative embodiment, the main control unit receives the input signal from the sensor SN, specifies the total conveyance amount B from the origin position O, and manages the information on the total conveyance amount B.

When the process of step S510 is finished, in step S520, the motor control unit 60 adds the current target conveyance amount Pt to the total conveyance amount B represented by the obtained information, and thus the total amount D of conveyance (D=B+Pt) after sheet conveyance based on the current drive command is calculated.

Then, the motor control unit 60 determines whether a condition expression of (B<C<D) is satisfied, based on a conveyance amount C at the increase of the load which is the total conveyance amount when the lead end starts to pass the flap 251, the total conveyance amount B at the present time, and the value D of the total conveyance amount after sheet conveyance based on the current drive command, and thus the motor control unit 60 determines whether the load on the motor 20 increases in the motor control process (sheet conveyance process) based on the current drive command. In other words, in step S530, if the condition expression of (B<C<D) is satisfied, the motor control unit 60 determines that a load increase event on the motor 20 occurs, and if the condition expression of (B<C<D) is not satisfied, the motor control unit 60 determines that the load increase event does not occur.

When it is determined that the load increase event on the motor 20 occurs (Yes in step S530), the motor control unit 60 sets a second control process flag J, which indicates whether to perform the second control process, to 1. On the other hand, when it is determined that the load increase event does not occur (No in step S530), the motor control unit 60 sets the second control process flag J to 0. Then, the motor control unit 60 finishes the pre-conveyance process.

When finishing the pre-conveyance process and starting to perform the main control process periodically, similarly to the first illustrative embodiment, the motor control unit 60 performs the first control process until the sheet, which is the driven object 10, reaches the first switch position P1. Then, when the sheet reaches the first switch position P1 (Yes in step S130), the motor control unit 60 proceeds to step S170. In step S170, the motor control unit 60 determines whether the sheet has reached the second switch position P2. When it is determined that the sheet has not reached the second switch position P2 (No in step S170), the motor control unit 60 performs a process shown in FIG. 13B, as the second control process.

Specifically, in step S200, the motor control unit 60 determines whether the value of the second control process flag J is 1. When it is determined that the value of the second control process flag J is 1 (Yes in step S200), in step S210, similarly to the first illustrative embodiment, based on the present rotation speed $\omega$ of the motor 20 specified in step S110, the motor control unit 60 calculates the suppositional current upper limit Uf smaller than the current upper limit Umax corresponding to the present rotation speed $\omega$, in accordance with the above-mentioned Equation 3. Then, in step S220, the motor control unit 60 inputs the current command value U (=Uf) corresponding to the suppositional current upper limit Uf, to the motor driver 30. Next, the motor control unit 60 sets the flag F to 1 in step S250, and finishes the main control process once. Instead of the process of step S210, the same process as step S215 of the second illustrative embodiment can be performed. Then, when the second control process flag J is 1, the motor control unit 60 performs the same second control process as the first illustrative embodiment (or the second to fourth illustrative embodiments) until the sheet reaches the second switch position P2.

On the other hand, when it is determined that the value of the second control process flag J is 0 (No in step S200), the motor control unit 60 proceeds to step S230. In step S230, based on the present rotation speed ω of the motor 20 specified in step S110, the motor control unit 60 calculates the current upper limit Umax corresponding to the present rotation speed ω in accordance with Equation 2. Then, in step S240, the motor control unit 60 inputs the current command value U (=Umax) corresponding to the current upper limit Umax, to the motor driver 30. Next, the motor control unit 60 finishes the main control process once.

Accordingly, when the value of the second control process flag J is 0, the motor control unit 60 performs the same first control process as the first illustrative embodiment (or the second to fourth illustrative embodiments) until the sheet reaches the second switch position P2.

After the sheet reaches the second switch position P2, the motor control unit 60 performs the same third control process as the above-mentioned first illustrative embodiment (or the second to fourth illustrative embodiments). The configuration of the control system 1 of the fifth illustrative embodiment is described in the above. According to this control system 1, whether to perform the second control process is determined in accordance with the result of the determination on an increase of the load.

In the fifth illustrative embodiment, in step S530, the motor control unit 60 determines whether the condition expression of (B<C<D) is satisfied, based on the total conveyance amount at the moment before the main control process is performed periodically based on drive command, thereby determining whether the load on the motor 20 increases in the motor control process (sheet conveyance process) based on the current drive command. However, in step S530, the motor control unit 60 may calculate the value B'(=B+P1) of the total conveyance amount at the end of the first control process by adding the first switch position P1 to the total conveyance amount B, and determine whether a condition expression of (B'<C<D) is satisfied, based on the value B', and thus the motor control unit 60 determines whether the load increase event on the motor 20 occurs after the first control process being the motor control process (sheet conveyance process) based on the current drive command (a modified fifth illustrative embodiment).

Modifications

Although the illustrative embodiments of this disclosure have been described in the above, this disclosure is not limited to the above-mentioned illustrative embodiments and may have various aspects. For example, this disclosure may be applied not only for sheet conveyance but also for motor control in an image forming apparatus.

In the above-mentioned illustrative embodiments, the motor control unit 60 specifies the position P and speed V of the driven object 10 based on the rotation position X of the motor 20 detected by the position detector 50, and the rotation speed ω of the motor 20 detected by the speed detector 55, and performs the driving control on the driven object 10 so that the position P and the speed V corresponds with the target values. However, since the rotation position X and rotation speed ω of the motor 20 and the position P and speed V of the driven object 10 are different from each other in their scales, the motor control unit 60 may perform the motor control by directly using the rotation position X of the motor 20 detected by the position detector 50 and the rotation speed ω of the motor 20 detected by the speed detector 55 so that the rotation position X and rotation speed ω of the motor 20 corresponds the target values, thereby indirectly performing the driving control on the driven object 10.

Also, in the above-mentioned illustrative embodiment, the rotary encoder 40 is connected to the rotation shaft of the motor 20 so that the position P and speed V of the driven object 10 are specified based on the rotation position X and rotation speed ω of the motor 20. However, the rotary encoder 40 may be connected to the driven object 10 so that the position P and speed V of the driven object 10 is directly detected by the rotary encoder 40. For example, the rotary encoder 40 can be connected to the rotation shaft of the conveyance roller 111. In this case, the rotation position X and rotation speed ω of the motor 20 can be specified based on the position P and speed V of the driven object 10.

In the above-mentioned illustrative embodiments, both of the position P and speed V of the driven object 10 are used to perform the control based on the target profiles. However, only one of the position P and speed V of the driven object 10 may be used to perform control based on the target profiles. Further, only one or two of the profiles of the target acceleration Ar, the target speed Vr, and the target position Pr may be set as the target profiles.

Correspondence

Finally, the correspondence between the terms will be described. The motor control unit 60 corresponds to an example of a motor control unit, and the rotary encoder 40 corresponds to an example of a signal output unit. Further, the first control process performed by the motor control unit 60 and steps S230 and S240 of the second control process of the fifth illustrative embodiment correspond to an example of a process implemented by a first control unit or an earlier-stage control unit, the second control process performed by the motor control unit 60 (except for steps S200, S230, and S240) correspond to an example of a process implemented by a second control unit, and the third control process performed by the motor control unit 60 corresponds to an example of a process implemented by a third control unit or a later-stage control unit.

Specifically, the first control process of the third illustrative embodiment and the fourth illustrative embodiment corresponds to an example of the process implemented by the earlier-stage control unit, and the third control process of the third illustrative embodiment and the fourth illustrative embodiment corresponds to an example of the process implemented by the later-stage control unit.

Further, the processes of steps S120, S130, S160, S170, and S200 performed by the motor control unit 60 correspond to examples of the process implemented by a switching unit, and the pre-conveyance process (the fifth illustrative embodiment) performed by the motor control unit 60 corresponds to an example of a process implemented by a determining unit. Furthermore, the main control unit 150 corresponds to an example of a conveyance control unit.

What is claimed is:

1. A motor control device comprising:
a motor control unit configured to control a motor; and
a signal output unit configured to output a signal according to rotation of the motor, wherein the motor control unit controls the motor based on an output signal of the signal output unit so that a driven object, driven by the motor, is displaced to a target stop position,
wherein the motor control unit is configured to function as:
a first control unit, a second control unit, a third control unit; and
a switching unit configured to sequentially switch between the first, second, and third control units, wherein the first control unit is configured to perform a first motor control, in which a current upper limit, which is an upper limit of current applicable to the motor and is adjusted by current degradation caused by a counter-electromotive force, is estimated based on a rotation speed of the motor specified from an output signal of the signal output unit, and in which a first driving current corresponding to the estimated current upper limit is input to the motor, wherein the second control unit is configured to perform a second motor control, in which a second driving current is input to the motor, the second driving current being at least one of: a driving current lower than the first driving current input to the motor at an end of the first motor control of the first control unit, and a driving current lower than a driving current to be input to the motor if the first control unit controls the motor based on a current upper limit estimated from a present rotation speed of the motor, is input to the motor, and wherein the third control unit is configured to perform a third motor control, in which a third driving current to be input to the motor is determined based on at least one of a speed and a displacement amount, as an operation amount of one of the motor and the driven object, specified from the output signal of the signal output unit, and a target trajectory of the operation amount, and in which the third driving current is input so that the driven object is displaced up to the target stop position corresponding to the target trajectory.

2. The motor control device according to claim 1, wherein the switching unit is configured to sequentially switch between the first, second, and third control units, in accordance with the displacement amount of one of the motor and the driven object specified from the output signal of the signal output unit.

3. The motor control device according to claim 1, wherein the second driving current has one of: a predetermined ratio lower than the first driving current input to the motor at the end of the first motor control of the first control unit, and a predetermined ratio lower than the driving current to be input to the motor when the first control unit controls the motor based on the current upper limit estimated from a present rotation speed of the motor.

4. The motor control device according to claim 1, wherein the first control unit is configured to calculate a value $K \cdot \omega$, which is obtained by multiplying the rotation speed $\omega$ of the motor specified from the output signal of the signal output unit by a predetermined coefficient K, as a current degradation amount caused by the counter-electromotive force, wherein the first control unit is configured to estimate a value $(Imax - K \cdot \omega)$, which is obtained by subtracting the value $K \cdot \omega$ from an upper current limit Imax in a case where there is no degradation caused by the counter-electromotive force, as the current upper limit adjusted by the degradation caused by the counter-electromotive force, and wherein the second control unit is configured to calculate a suppositional current upper limit $(Imax - K' \cdot \omega)$ by using a coefficient K' larger than the coefficient K and to input the suppositional current upper limit as the second driving current to the motor, similarly to the first driving current of the first control unit.

5. The motor control device according to claim 1, wherein the motor control unit is configured to function as a determining unit configured to determine whether a load on the motor increases in a process of displacing the driven object to the target stop position, wherein, when the determining unit determines that the load increases after the motor control of the first control unit finishes, the switching unit sequentially operates the second control unit and the third control unit, and wherein, when the determining unit determines that the load does not increase after the motor control of the first control unit finishes, the switching unit operates the third control unit without operating the second control unit.

6. The motor control device according to claim 1, wherein, at the beginning of the third motor control, the third control unit is configured to perform a deceleration motor control to decrease the rotation speed of the motor based on the target trajectory.

7. The motor control device according to claim 6, wherein the third control unit is configured to control the motor so that the motor rotates at a constant speed after performing the deceleration motor control, and wherein the third control unit sets, as an initial value of a target acceleration, one of an acceleration A0 of the motor and the driven object at the end of the second motor control of the second control unit, based on both of a speed V0 of one of the motor and the driven object specified from the output signal of the signal output unit at the end of the motor control of the second control unit, and a standard speed Vc of one of the motor and the driven object, which is a speed when rotating the motor at a constant speed and which is lower than the speed V0, wherein the third control unit is configured to set the speed V0 as an initial value of a target speed, wherein the third control unit is configured to set, as the target trajectory to be used at the beginning of an operation start, a trajectory, in which a deceleration time period to reach the standard speed Vc is set to a time period corresponding to a ratio (V0−Vc)/A0 between a difference (V0−Vc) between the speed V0 and the standard speed Vc, and acceleration A0, and in which the target speed smoothly and monotonically decreases to the standard speed Vc, and wherein the third control unit is configured to control the motor based on the target trajectory so that the motor rotates at the constant speed after the rotation speed of the motor decreases.

8. An image forming apparatus comprising:
a motor;
a conveying unit that includes a roller configured to be driven by the motor, and configured to convey a driven recording medium by rotation of the roller;
an image forming unit configured to form an image on the driven recording medium conveyed by the conveying unit;
the motor control device according to claim 1 configured to control the motor to cause the conveying unit to convey the driven recording medium to the target stop position, and
a conveyance control unit configured to designate the target stop position and repeatedly operate the motor control device, so that the conveying unit stepwisely conveys the driven recording medium.

9. The motor control device of claim 1, wherein the switching unit is configured to:
switch from the first motor control to the second motor control in response to a determination that the driven object has reached a first predefined position; and switch from the second motor control to the third motor control in response to a determination that the driven object has reached a second predefined position.

10. A motor control device comprising:
a motor control unit configured to control a motor; and
a signal output unit configured to output a signal according to rotation of the motor,
wherein the motor control unit is configured to control the motor based on the output signal of the signal output unit so that a driven object, which is driven by the motor, is displaced to a target stop position,
wherein the motor control unit is configured to function as:
  an earlier-stage control unit configured to operate in an earlier stage of displacing the driven object up to a target stop position,
  a later-stage control unit configured to operate in a later stage of displacing the driven object up to the target stop position, and
  a switching unit configured to sequentially switch the earlier-stage control unit and the later-stage control unit,
wherein the earlier-stage control unit is configured to perform an earlier motor control, in which a current upper limit, which is an upper limit of current applicable to the motor and which is adjusted by current degradation caused by a counter-electromotive force, is estimated based on a rotation speed of the motor specified from an output signal of the signal output unit, and in which an earlier driving current corresponding to the estimated current upper limit is input to the motor,
wherein the later-stage control unit is configured to perform a later motor control, in which a later driving current to be input to the motor is determined based on at least one of a speed and a displacement amount, as an operation amount of one of the motor and the driven object, specified from the output signal of the signal output unit, and a target trajectory of the operation amount, and in which the later driving current is input so that the driven object is displaced up to the target stop position along the target trajectory, and
wherein, after a predetermined condition is satisfied after the motor control of the earlier-stage control unit finishes, the switching unit operates the later-stage control unit so that the later driving current is not input to the motor until the predetermined condition is satisfied after the motor control of the earlier-stage control unit finishes.

11. The motor control device of claim 10, wherein the predetermined condition includes the driven object reaching a predefined position.

* * * * *